United States Patent [19]

Noguchi

[11] 4,445,184
[45] Apr. 24, 1984

[54] ARTICULATED ROBOT

[75] Inventor: Fumio Noguchi, Takarazuka, Japan

[73] Assignee: Shin Meiwa Industry Co., Ltd., Nishinomiya, Japan

[21] Appl. No.: 283,117

[22] Filed: Jul. 13, 1981

[30] Foreign Application Priority Data

Jul. 19, 1980 [JP] Japan .................................. 55-99179
Mar. 27, 1981 [JP] Japan .................................. 56-45824
Apr. 11, 1981 [JP] Japan .................................. 56-54780

[51] Int. Cl.³ .................... G06F 15/46; G05B 19/42; B25J 9/00
[52] U.S. Cl. .................................... 364/513; 318/568; 364/191; 414/7; 414/730
[58] Field of Search ........ 364/513, 478, 474, 191–193; 318/568; 414/4, 7, 730, 694

[56] References Cited

U.S. PATENT DOCUMENTS

| | | | |
|---|---|---|---|
| 3,790,002 | 2/1974 | Germond et al. | 414/4 X |
| 3,909,600 | 9/1975 | Hohn | 364/193 X |
| 3,920,972 | 11/1975 | Corwin, Jr. et al. | 364/513 |
| 4,221,997 | 9/1980 | Flemming | 364/513 X |
| 4,259,876 | 4/1981 | Belyanin et al. | 414/7 X |
| 4,308,584 | 12/1981 | Arai | 414/730 X |

*Primary Examiner*—Joseph F. Ruggiero
*Attorney, Agent, or Firm*—Darby & Darby

[57] ABSTRACT

An articulated robot comprises one or more articulation angles that can assume two states on the occasion of the same position or attitude of an object being controlled. A change from one to the other of the above described two states is taught by operating an operation panel and the respective driving means of two arms constituting one articulation angle are controlled based on the above described teaching information so that the articulation angle may be changed from one state to the other state, whereby rotation of the respective arms is controlled.

18 Claims, 33 Drawing Figures

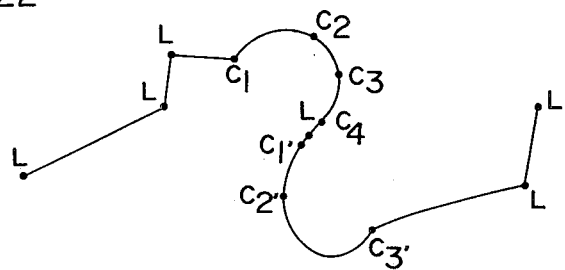
FIG. 22
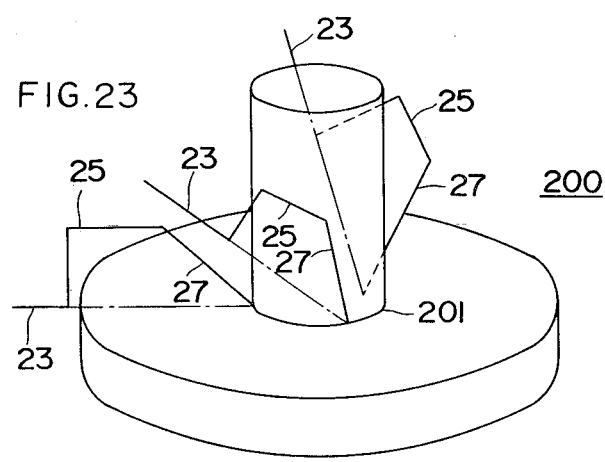
FIG. 23
FIG. 24
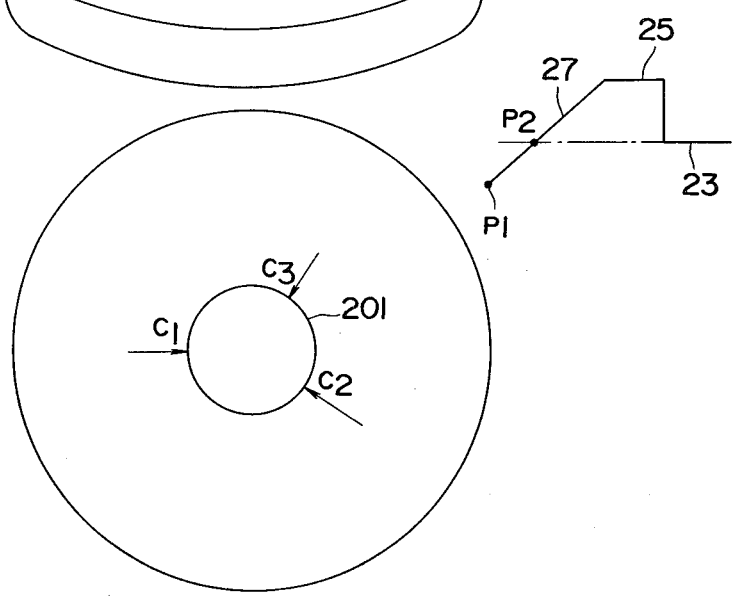

ARTICULATED ROBOT

BACKGROUND OF THE INVENTION

1. Field of the Invention

The present invention relates to an articulated robot. More particularly, the present invention relates to an articulated robot having a multiple of freedom which can be advantageously utilized in an automatic welding apparatus or the like, wherein information is taught in one or two coordinates systems and movement is controlled in an articulated system.

2. Description of the Prior Art

Articulated robots have been heretofore utilized in manipulators or other types of automated machines. One example of such articulated robots is disclosed in Japanese Patent Laying Open Gazette No. 50376/1974. A typical articulated robot comprises at least one arm turnable provided about a given shaft and a second arm rotatably provided about the above described arm. A third arm, a fourth arm and so on are in succession turnably provided and a functional element such as a welding torch, a holder or the like is provided at the end of the last arm. The turning angles of the respective arms are controlled so that the holder, the welding torch and the like are controlled to a desired position, whereupon welding or other processing is performed as necessary.

A conventional articulated robot is adapted such that the first arm and the second arm turnably provided to the first arm can assume one state in which the first arm and the second arm are bent at the journal shaft starting from a predetermined state in which both arms are aligned in a linear manner. Conversely described, a conventional articulated robot was adapted such that a bent state is controllably achieved only in a given one direction. However, assuming that the arms can assume only one state depending on the magnitude or the geometry of workpiece, it could happen that the arm collides with the workpiece. In such a case, the welding torch can not be controlled to such target position, unless a workpiece fixing state or position is changed. Thus, it is extremely tiresome to change the position of the workpiece to avoid collision of the arm and the workpiece in the course of operation of automatic welding and the like, for example.

SUMMARY OF THE INVENTION

An articulated robot comprises at least one articulation angle formed with a first and second arms, which articulation angle is structured to assume two states on the occasion of the same position or attitude of an object being controlled, and information concerning a change from one state to the other state of the above described two states is taught as teaching information and driving means of the respective arms are controlled so that the articulation angle is changed from one state to the other state of the above described two states based on the teaching information.

According to the present invention, the articulated robot can assume two states of a first and second states of turnable arms. With a conventional articulated robot, it could happen that a workpiece collides with such turnable arms depending on the shape of a workpiece or the position of a welding point, for example, which necessitated a change of the position of the workpiece to avoid such situation. However, according to the present invention, since the state of such turnable arms can be reversed, such possible collision can be eliminated without changing the position of the workpiece. Since such reversion of the state of the turnable arms can be simply taught and reproduced, manipulation of the machine is more facilitated.

According to one embodiment of the present invention, information representing which one of the two states is taught. Accordingly, the respective driving systems control the corresponding arms responsive to the information representing such states.

According to another embodiment of the present invention, an articulated robot is controlled under the cartesian or rectangular coordinates system and the articulated system and, in a teaching mode, if and when the articulation angle assumes only one state, the information is taught only in the rectangular coordinates system, whereas if and when there is a shift or change from one to the other of the above described two states the position or the attitude before and after such change is taught in the articulated system. According to the embodiment in discussion, even a change among the two states can be taught by simply switching the system from the rectangular coordinates system to the articulated system without necessity of teaching particular information and accordingly an operation on the occasion of teaching is more facilitated.

An articulated robot employing the present invention comprises a support member, a first arm having the base end thereof pivoted by a first shaft on the support member, a second arm having the base end pivoted by a second shaft in parallel with the first shaft at the tip end of the first arm, a first and second prime movers for controlling the turnable angle of the first and second arms provided rearward of the support member, the first prime mover and the first arm being coupled through a pulley and belt and the second prime mover and the second arm being coupled through a counter pulley coaxial with the first shaft, a pulley coaxial with the second shaft, and a belt set therebetween.

According to the embodiment, a mechanism for controlling the arms is implemented not by a conventional parallelogram link mechanism but by a combination of belts and pulleys and therefore can drastically increase the range of the turnable angle of the respective arms as compared with a conventional one. Since a prime mover is provided rearward of the support member, there is little possibility of collision of the prime movers with an operator or a workpiece when the support member is to be turned. By coupling the pulleys at the last stage to the output shaft of speed reducing apparatus, a tension of the belts can be decreased as much as possible, whereby extension thereof can be decreased as much as possible. Therefore, accuracy which is liable to be influenced by such extension is much more improved.

Accordingly, a principal object of the present invention is to provide an articulated robot, wherein the states assumable by the respective articulation angles with respect to the same position or attitude can be increased as compared with a conventional one, thereby to enable a control of versatility.

One aspect of the present invention resides in an articulated robot, wherein the articulation angle can assume two states and the turned states of such arms can be taught and reproduced arbitrarily.

Another aspect of the present invention resides in an articulated robot which is simple in operation for teaching and reproduction and is of versatility.

A further aspect of the present invention resides in an articulated robot of an increased range of the turnable angle of the respective arms.

Still a further aspect of the present invention resides in an articulated robot, wherein the accuracy of the respective turnable angles has been much more improved.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a view for explaining one example of a free curve that can be taught and reproduced in accordance with the embodiment;

FIG. 23 is a view showing a workpiece and a welding line for explaining the effect of the embodiment of the present invention;

FIG. 24 is a view showing one example in the case where the welding point of the torch and the axial line are dislocated;

DESCRIPTION OF THE PREFERRED EMBODIMENTS

Figure 1:
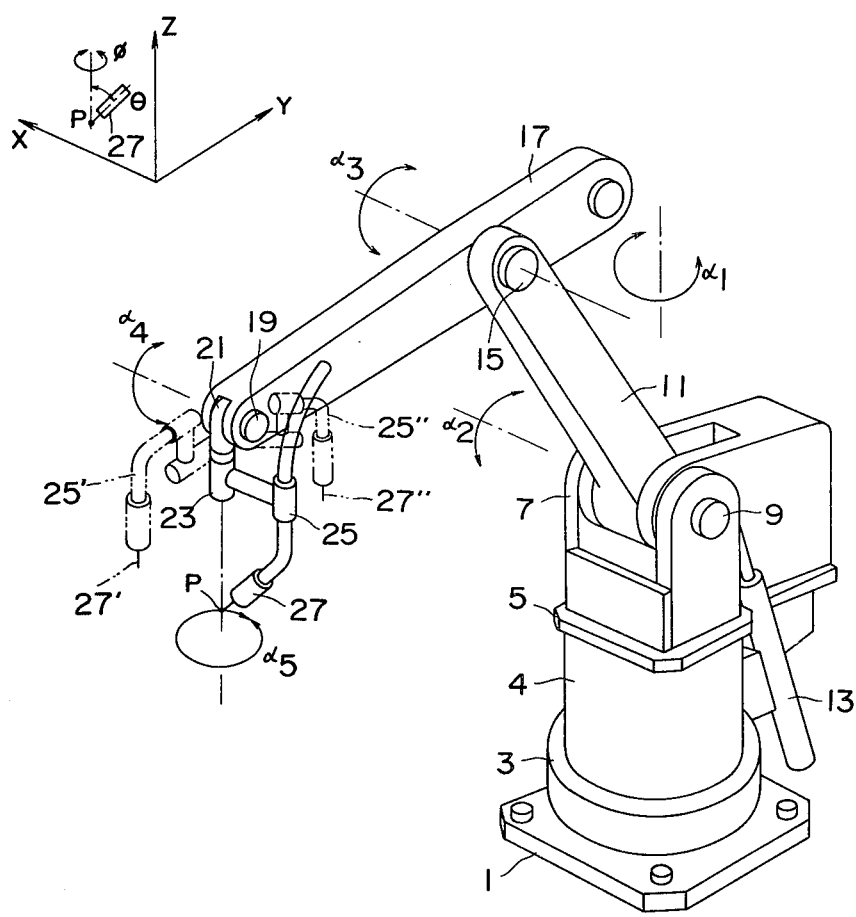
FIG. 1 is a view showing an automatic welding apparatus by way of an example of an articulated robot which constitutes the background of the invention and in which the present invention can be employed.

FIG. 1 is a view showing one example of an automatic welding apparatus employing an articulated robot which constitutes the background of the invention and in which the present invention can be employed. A fixing member 1 is fixed to the ground, for example, and the fixing member 1 is provided with a cylindrical base 3 of a relatively small height. A cylindrical rotating member 4 of a relatively large height is provided to be rotatable about a rotation axis, not shown, on the top of the cylindrical base 3. A vertical rotating shaft is provided in a hollow portion, not shown, of the cylindrical rotating member 4 and a rotating member 5 is provided on the above described cylindrical rotating member 4 so as to be supported to be rotatable integrally with the cylindrical rotating member 4. The cylindrical rotating member 4 and thus the rotating member 5 is driven to be rotated for the rotation angle $\alpha_1$ by means of a motor, not shown, to be described subsequently. The rotating member 5 has supporting members 7 extending from the top surface thereof in the vertical direction and in parallel with each other. A turning arm 11 is supported to be turnable for the turning angle $\alpha_2$ by means of a shaft 9 in the horizontal direction. Meanwhile, the turning arm 11 is driven to be turned by means of a motor, not shown, to be described subsequently. A balancing mechanism 13 is also provided in association with the turning arm 11 for the purpose of balancing the turned state of the turning arm. The balancing mechanism 13 comprises a tension spring, for example, not shown, so that the same may be turned together with the cylindrical rotating member 4.

A turning arm 17 is supported to be turnable with respect to the arm 11, i.e. for the turning angle $\alpha_3$ by means of a shaft 15 in parallel with the shaft 9 at the end of the turning arm 11. The turning arm 17 is driven to be turned by means of a motor, not shown, to be described subsequently. A turning wrist 21 is supported to be turnable with respect to the turning arm 17, i.e. for the turning angle $\alpha_4$ by means of the shaft 19 in parallel with the shaft 9 at one free end of the turning arm 17. The wrist 21 is driven to be turned about the shaft 19 by means of a motor, not shown, to be described subsequently. A rotating shaft 23 for supporting a torch fixture 25 is supported by the wrist 21 so as to be rotatable about the same shaft with respect to the wrist 21. The shaft 23 is driven to be rotated with respect to the wrist 21, i.e. for the rotating angle $\alpha_5$ by means of a motor, not shown, to be described subsequently. A welding torch 27 is fixed to the torch fixture 25. Thus, the automatic welding apparatus is adapted such that the attitude of the welding torch 27 and the tip end, i.e. the position of the welding point P are controlled by controlling the respective angles $\alpha_1$, $\alpha_2$, $\alpha_3$, $\alpha_4$ and $\alpha_5$ of the rotating member 5, the turning arm 11, the turning arm 17, the wrist 21, and the rotating shaft 23, respectively.

Figure 2:
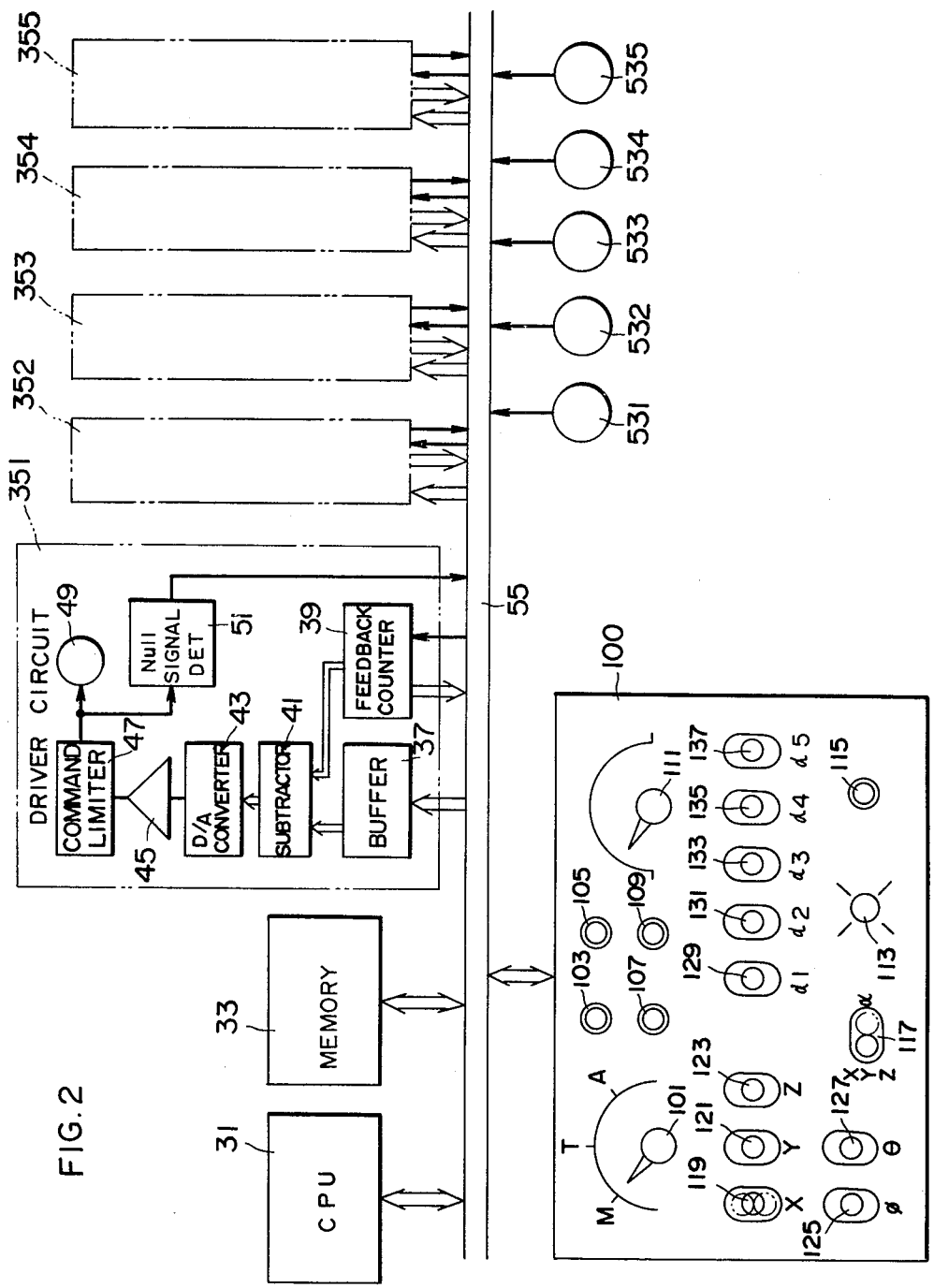
FIG. 2 is a block diagram showing an outline of one embodiment of the present invention.

FIG. 2 is a block diagram showing an outline of one embodiment of the present invention. The embodiment shown comprises an operation panel 100. The operation panel 100 comprises a mode selecting switch 101 for commanding in which operation mode the automatic welding apparatus is to be operated. The mode selecting switch 101 is structured to select any mode among a manual mode M, a test mode T and an automatic mode A. The operation panel 100 further comprises depression button switches 103, 105, 107 and 109. The depression button switch 103 is adapted to afford a start command of the automatic mode and also to afford a teaching command in the manual mode. The depression button switches 105, 107 and 109 are each operated in commanding to the automatic welding apparatus a linear interpolating operation, a weaving operation and an arcuate interpolating operation, respectively. A speed setting unit 111 is also provided. The speed setting unit 111 is used to command the speed of movement of the welding torch 27 and thus of the welding point P. The operation panel 100 is provided with manual switches 119, 121, 123, 125 and 127; and 129, 131, 133, 135 and 137 of two groups. The switches 119 to 127 are operated to control the position of the welding apparatus in terms of the rectangular coordinates system, i.e. the XYZ system. On the other hand, the switches 129 to 137 are used to directly control the respective turning angles $\alpha_1$ to $\alpha_5$, i.e. control the $\alpha$ system. Therefore, the operation panel 100 is also provided with a system selecting switch 117 for selectively enabling the group of the switches 119 to 127 or the group of the switches 129 to 137. Accordingly, by turning the system selecting switch 117 to the left, as viewed in FIG. 2, the group of the manual switches 119 to 127 is enabled, and by turning the switch 117 to the right, the group of the manual switches 129 to 137 is enabled. These manual switches 119 to 127 and 129 to 137 can each assume three positions, wherein the position shown by the solid line in FIG. 2 is a neutral position. The switches 119, 121 and 123 are used to control the X axis, the Y axis and the Z axis, respectively, wherein the direction away from the origin point of the rectangular coordinates is defined as the upward direction U and the direction toward the origin point of the rectangular coordinates is defined as the downward direction D. The switch 125 is used to control an orientation angle $\phi$ of the welding torch 27 and the switch 127 is used to control an attitude angle $\theta$ of the welding torch 27. These switches 125 and 127 can be used to control the angles $\phi$ and $\theta$ associated with the welding torch in the clockwise direction C or the counterclockwise direction CC, respectively. Likewise, the manual switches 129 to 137 of the $\alpha$ system can also be used to control the turning angles $\alpha_1$ to $\alpha_5$, respectively, of the respectively arms or the shafts, in the clockwise direction C or the counterclockwise direction CC. A display lamp 113 and a depression button switch 115 provided on the operation panel 100 constitute one feature of the embodiment shown. More specifically, the display lamp 113 is energized to be turned on when the turning arms and the rotating shafts are in a predetermined zone to be described subsequently (or a critical zone), thereby to notify an operator of the same. Accordingly, the display lamp 113 may be replaced by a buzzer for raising an alarm by way of an audible sound or alternatively both may be used simultaneously. The depression button switch 115 is used to set a state of a given turning arm and another turning arm associated therewith, i.e. a first state or a second state. More specifically, the bending direction of the respective turning arms is reversed such as from the first state to the second state or from the second state to the first state, the depression button switch 115 is operated. These first and second states will be described subsequently. Data is exchanged through an interface, not shown, between the operation panel 100 including the above described components and a data bus 55.

The data bus 55 is coupled to a central processing unit 31 constituting a control means and a memory 33. The memory 33 comprises a read only memory for storing a system program and a user program of the central processing unit 31 and a random access memory having storing regions and flag regions required for making an arithmetic operation and other processing by the central processing unit 31. The data bus 55 is coupled to a plurality of (in the embodiment shown, five corresponding to the five turning angles $\alpha_1$ to $\alpha_5$) driving circuits 351, 352, 353, 354 and 355 and a plurality of (in the embodiment shown, five) incremental encoders 531, 532, 533, 534 and 535. Referring to FIG. 2, the driving circuit 351 is illustrated in more detail representing the others. Although the structure of the driving circuit 351 is described here, it is pointed out that the remaining driving circuits 352 to 355 are also similarly structured.

The driving circuit 351 comprises a commanded position buffer 37 for storing commanded position information obtained from the central processing unit 31, and a feedback counter 39 for counting the pulse signal obtained from the corresponding incremental encoder 531. The content in the commanded position buffer 37 and the content in the feedback counter 39 are applied to a subtractor 41 as a minuend and a subtrahend, respectively. The output of the subtractor 41 is applied to a digital/analog converter 43. Accordingly, the digital/analog converter 43 provides a voltage signal associated with a difference between the commanded position and the current position. The output from the digital/analog converter 43 is applied through a servoamplifier 45 and a command limiter 47 to a servomotor 49 as a driving signal. The output of the command limiter 47 is further applied to a null signal detecting circuit 51. The null signal is a zero signal obtained from the servoamplifier 45 when the position is controlled by the servo system and is obtained in the region adjacent to the target position or at the timing when the motor 49 is about to be brought to a stop. Accordingly, the output of the null signal detecting circuit 51 is applied through the data bus 55 to the central processing unit 31 as a signal representing that the object being controlled by means of the servomotor 49 has reached the commanded position loaded in the commanded position buffer 37.

Figure 3:
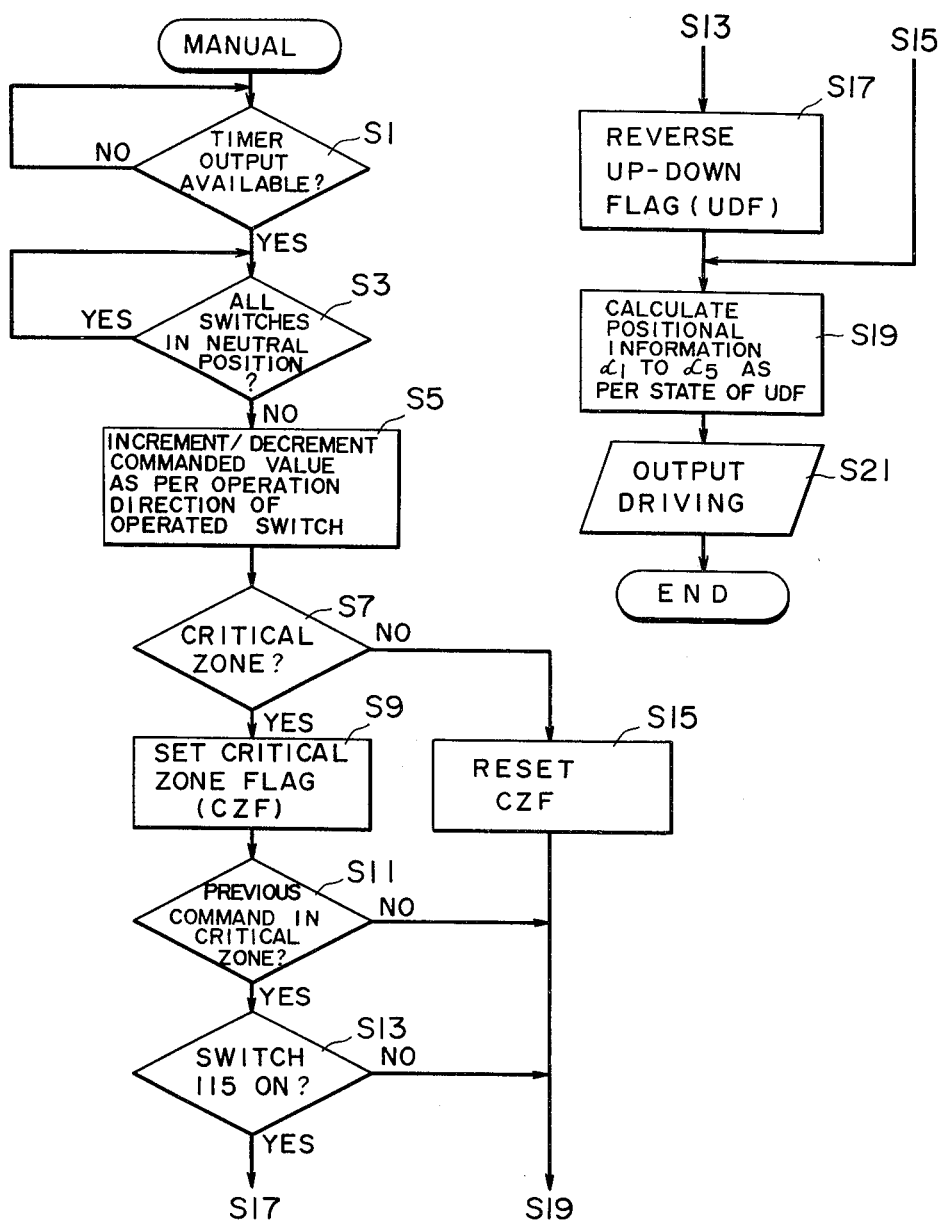
FIGS. 3 to 5 are flow diagrams for explaining the operation of the embodiment.
Figure 4:
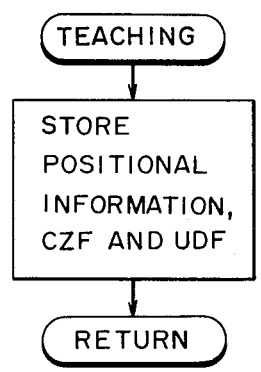

Since the structure was described in the foregoing, now the operation of the embodiment shown in FIG. 2 and thus of FIG. 1 will be described in the following with reference to the flow diagrams shown in FIGS. 3 to 5 and the diagrams shown in FIGS. 6 to 14.

At the outset the manual mode for the teaching operation will be described. The central processing unit 31 comprises a timer for receiving a clock from a clock source provided therein and the timer is responsive to the clock to generate an output per each predetermined time period. The central processing unit 31 is responsive to the output from the timer to be interrupted thereby at the step S1. At the first step S3 it is determined whether the manual switches 119, 121, 123, 125 and 127 of the respective axes of the operation panel 100 have all been brought to a neutral position. In other words, at the step S3 it is detected whether any of these manual switches 119 to 127 has been operated. Meanwhile, in the manual mode, in most cases the welding line of the workpiece is adapted to extend in the right angle direction when the command is given in the rectangular coordinates system and therefore it is easier for an operator to move the torch 27 along the welding line and also to make an interpolating operation. Therefore, the system selecting switch 117 provided in the operation panel 100 is in advance turned to the XYZ system. Then at the step S5 the central processing unit 31 is responsive to the signal from the operation panel 100 to increase or decrease the commanded value (the fundamental amount) corresponding to the above described timer time period based on the operation direction (U or D or C or CC) of the operated manual switch and the speed as set in the speed setting unit 111. Then at the step S7 it is determined whether the commanded position as a result of accumulation is in the critical zone.

Figure 6:
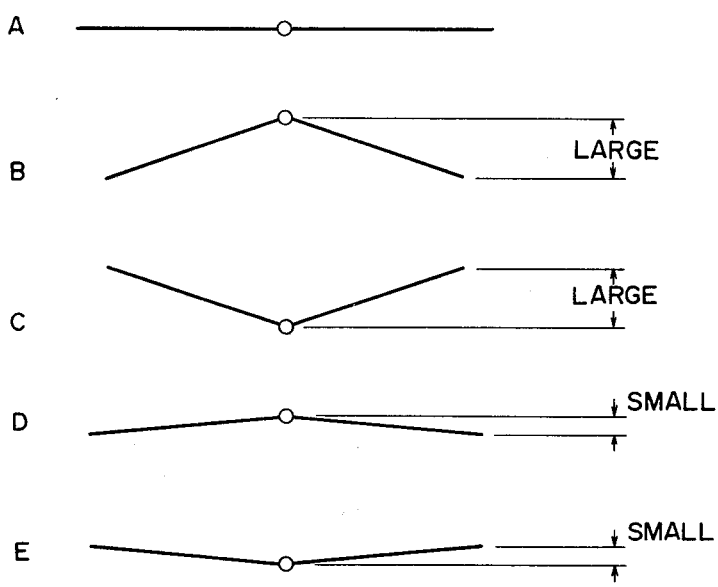
FIG. 6 is a view for explaining the state or a critical zone of the turnable arms.

Now the "critical zone" will be described. Considering the turning arms 11 and 17, for example, in FIG. 1, the state that can be assumed by these arms 11 and 17 is as shown in FIG. 6. Referring to FIG. 6, (A) shows a state in which the arms 11 and 17 are aligned almost in a line with respect to the shaft 15. (B) in FIG. 6 shows a state of the arms 11 and 17 in which the arms 11 and 17 are bent with the shaft 15 upward, which state is just as shown in FIG. 1. The state as shown in FIG. 6(B) is referred to as a first state (or an up state (U)). FIG. 6(C) shows a state which is opposite to that shown in FIG. 6(B). The state shown in FIG. 6(C) is referred to as a second state (or a down state (D)). FIG. 6(D) shows a state similar to that shown in FIG. 6(B) of the first state but having smaller bending of the arms 11 and 17 as compared with the first state shown in FIG. 6(B). Likewise, FIG. 6(E) shows a state of a very small bending as compared with the second state shown in FIG. 6(C). The states shown in (D) and (E) in FIG. 6 may be handled as almost the same as the state shown in FIG. 6(A). By the term "critical zone", the case of a very small bending of two arms as shown in (D) and (E) in FIG. 6 or the case of no bending of two arms as shown in FIG. 6(A) is meant, in which case the zone has a given minor width. Thus, the states as shown in (A), (D) and (E) in FIG. 6 are referred to as "a state in the critical zone". Meanwhile, the state shown in (D) in FIG. 6 is referred to as "a critical zone up state (Cu)" for convenience and the state shown in (E) in FIG. 6 is referred to as "a critical zone down state (Cd)". Meanwhile, such critical zone and the state may be likewise considered with respect to the wrist 21 and the shaft 23 as well.

More specifically, considering the wrist 21 and the shaft 23, i.e. the turning angle $\alpha_4$ and the rotation angle $\alpha_5$, two states can be assumed as described above, in the case of the same torch attitude such as the case where control is made to a state in parallel with the vertical axis. Such two states are the position of "27'" shown by the two dotted line and the position of "27''''" shown by the two dotted line in FIG. 1. For convenience the state as shown at the position of "27''''" is referred to as the first state (U) and the state shown as "27'''" is referred to as the second state (D). Meanwhile, in the figure the tip end positions of the torches 27' and 27'' are different; however, if it is desired that these brought to the same welding point position, the other shafts and the turning arms may be properly set. As is seen from FIG. 1, in the embodiment shown the axis of the torch 27 is fixed at 45° with respect to the axis $\alpha_5$. However, it could happen that such angle be desirably changed depending on the shape and the like of the workpiece. Therefore, the embodiment shown has been adapted such that the angle of the axis of the torch 27 with respect to the axis of the horizontal direction of the rectangular coordinates system may be arbitrarily and changeably controlled from the state (minimum) to 90° (maximum) shown in FIG. 1. In the embodiment shown the position of "27" shown by the solid line in FIG. 1 is set as the center of the critical zone. Accordingly, it is adapted such that in the case where it is desired to change as necessary the state from the position of "27'''" (the second state), for example, to the position of "27''''" (the first state), such state can not be changed unless the position of "27" (the critical zone) is necessarily passed. Meanwhile, the critical zone has a given width as described previously and the critical zone up (Cu) is selected to be a range from the position shown by the solid line to the position dislocated to the "27''''" side in FIG. 1, while the opposite case is set as the critical zone down (Cd).

At the step S7 the central processing unit 31 determines whether the relation of such two arms is in the critical zone. The reason why it is determined at the step S7 whether the relation of the two arms is in the critical zone or not may be described as follows. More specifically, the embodiment shown has been defined such that in order to reverse the first state (or the (U) state) shown in (B) in FIG. 6 to the second state (or the (D) state) shown (C) in FIG. 6, once the critical zone must be commanded and be taught. The reason is that if reversion is made outside the critical zone then the movement of the tip end of the arm is indefinite and collision with a workpiece and the like could occur.

If and when it is determined at the step S7 that the current commanded value is in the critical zone, the central processing unit 31 writes the logic one in the critical zone flag CZF included in the random access memory of the memory 33, whereby the flag CZF is set at the step S9. Then at the following step S11 the central processing unit 31 determines whether the previously commanded value was in the critical zone. The decision at the step S11 can be performed by checking the content in the flag CZF previously taught. Then at the step S13 the central processing unit 31 determines whether a state reversion command is available, i.e whether the depression button switch 115 of the operation panel 100 has been operated. More specifically, in the case where the state before entering into the critical zone was the first state (U) and the same need be changed to the second state (D), the reversion switch 115 is operated. More specifically, if the state reversion is necessary, the switch 115 is depressed with the lamp 113 in a lit state. Upon detection of the reversion command, the central processing unit 31 reverses the up-down flag UDF at the following step S17. The flag UDF is selected such that the logic one is written in the case of the state of (B) in FIG. 6, for example, and the logic zero is written in the case of the state of (C) in FIG. 6, for example.

On the other hand, if it is determined at the step S7 that the commanded value at this time is not in the critical zone, at the following step S15 the logic zero is written in the critical zone flag CZF, thereby to reset the same. Thereafter as in the case of passage of the step S17, the positional information is calculated on the articulated system, i.e. $\alpha_1$ to $\alpha_5$, in accordance with a situation of the up-down flag UDF. More specifically, in the embodiment shown the command is given in the XYZ system and calculation is made of the $\alpha_1$ to $\alpha_5$ system only in the case where drivings are performed in actuality by the driving circuits. The central processing unit 31 provides the positional information of the $\alpha_1$ to $\alpha_5$ system calculated at the previous step S19 to the respective corresponding driving circuits 351, 352, 353, 354 and 355. The respective driving circuits 351 to 355 are responsive to the command from the central processing unit 31 to control $\alpha_1$, $\alpha_2$, $\alpha_3$, $\alpha_4$ and $\alpha_5$ shown in FIG. 1. Such control is performed per each timer time period.

In the case of the teaching operation, the start button 103 of the operation panel 100 is dispressed. More specifically, the mode selection switch 101 is turned to the manual mode M and the start button 103 is depressed, whereby the teaching operation of the central processing unit 31 is interrupted. When the teaching operation is interrupted in the central processing unit 31, the positional information and the states of the respective flags CZF and UDF at that time are stored in the predetermined storing areas of the memory 33 (FIG. 4). The positional information being taught at that time is the absolute coordinates system (XYZ system). The reason is that the absolute coordinates system is easier of being operated and is preferred in arithmetic operation for the interpolating control, as described previously.

Now referring to FIGS. 7 to 14, the coordinates conversion from the XYZ system to the $\alpha_1$ to the $\alpha_5$ system will be described. In the embodiment shown the central processing unit 31 may comprise a microcomputer. Recently a microcomputer of an enhanced performance and a high speed operation has become available. Therefore, the embodiment shown has been adapted such that a normal calculation is performed with accuracy in lieu of a conventional approximate calculation processing.

Figure 7:
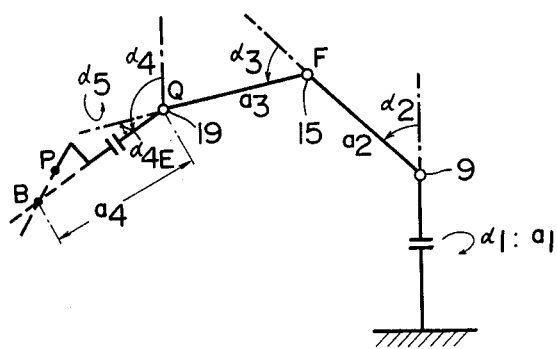
FIGS. 7 to 14 are views for use in explaining coordinates conversion.

FIG. 7 diagrammatically shows an outline of the FIG. 1 automatic welding apparatus. $\alpha_1$ to $\alpha_5$ in FIG. 7 correspond to those in FIG. 1. Referring to FIG. 7, $a_1$ denotes a length component from the lower end of the fixing member 1 to the shaft 9, $a_2$ denotes the length from the shaft 9 to the shaft 15, $a_3$ denotes a length component from the shaft 15 to the shaft 19, $a_4$ denotes a length component from the shaft 19 to the point B where the extension of the welding torch 27 and the extension of the wrist 21 intersect. The point F denotes the position of the shaft 15, the point Q denotes the position of the shaft 19, and the point P denotes the tip end of the welding torch 27, i.e. the welding point. The angle $\alpha_1$ denotes the rotating angle of the rotating member 5, $\alpha_2$ denotes the turning angle of the turning arm 11, and $\alpha_3$ denotes the turning angle of the turning arm 17. The angle $\alpha_4$ denotes the turning angle of the wrist 21 in terms of the angle with respect to the vertical axis. The angle $\alpha_5$ denotes the rotating angle of the shaft 23 set to be 0° in the vertical axis direction.

Figure 8:
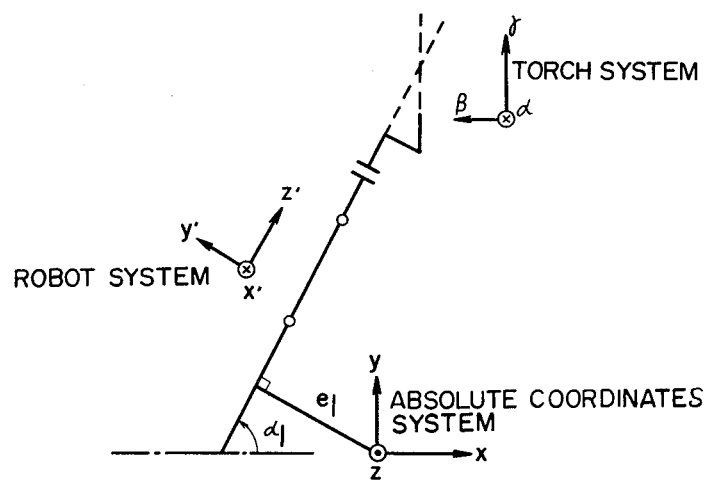
Figure 9:
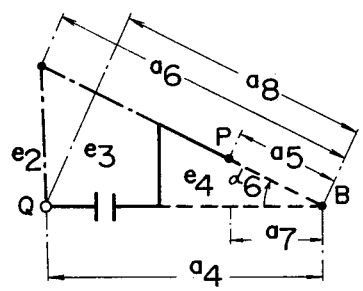

FIG. 8 is a view diagrammatically showing a state of the apparatus as shown in FIGS. 1 and 7 as viewed from the top. Referring to FIG. 8, the "absolute coordinates system" means the cartesian or rectangular coordinates system with the approximate center at the lower end of the fixing member 1 (FIG. 1) as deemed as the origin point of the coordinate axes. On the other hand, the "robot system" means the cartesian or rectangular coordinates system with a given point of the apparatus deemed as the origin point. Furthermore, the "torch system" means the cartesian or rectangular coordinates system with the point B in FIG. 7 as deemed with the origin point. Meanwhile, FIG. 9 is a view showing in detail the portion between the points Q and B, wherein the angle component $\alpha_6$ is constant. The cartesian or rectangular coordinates system here is represented by the respective translation axis components and the angle components, i.e. (x, y, z, $\phi$, $\theta$), while the articulated coordinates system is represented by the angle components, i.e. ($\alpha_1$, $\alpha_2$, $\alpha_3$, $\alpha_4$, $\alpha_5$).

When the position of the rectangular coordinates system of the respective points F, Q and P when the respective angles $\alpha_1$ to $\alpha_5$ are given in FIG. 7, the X axis component, Fx, the Y axis component Fy and the Z axis component Fz of the point F may be expressed by the following equations.

$Fx = -e_1 \sin\alpha_1 + a_2 \sin\alpha_2 \cdot \cos\alpha_1$ $Fy = e_1 \cos\alpha_1 + a_2 \sin\alpha_2 \cdot \sin\alpha_1$ $Fz = a_1 + a_2 \cos\alpha_2$ Likewise, the respective axis components Qx, Qy, and Qz of the point Q and the respective axis components Bx, By, and Bz of the point B may be expressed by the following equations.

$Qx = Fx + a_3 \sin(\alpha_2 + \alpha_3) \cdot \cos\alpha_1$ $Qy = Fy + a_3 \sin(\alpha_2 + \alpha_3) \cdot \sin\alpha_1$ $Qz = Fz + a_3 \cos(\alpha_2 + \alpha_3)$ $Bx = Qx + a_4 \sin\alpha_4 \cdot \cos\alpha_1$ $By = Qy + a_4 \sin\alpha_4 \cdot \sin\alpha_1$ $Bz = Qz + a_4 \cos\alpha_4$ $\alpha_4 = \alpha_2 + \alpha_3 + \alpha_{4E};$ In order to evaluate the respective axis components of the point P and the orientation angle $\phi$ and the attitude angle $\theta$ of the welding torch 27, the coordinates conversion from the robot system to the torch system at the point Q is made. Meanwhile, in the following equations "$c_i$" means "$\cos\alpha_i$" and "$s_i$" means "$\sin\alpha_i$". For the purpose of the above described coordinates conversion, the following equation (1) is given.

$$\begin{pmatrix} x \\ y \\ z \\ 1 \end{pmatrix} = \begin{pmatrix} c_1 & -s_1 & & \\ s_1 & c_1 & & \\ & & 1 & \\ & & & 1 \end{pmatrix} \begin{pmatrix} c_4 & & s_4 & \\ 0 & 1 & 0 & \\ -s_4 & & c_4 & \\ & & & 1 \end{pmatrix} \quad (1)$$

$$\begin{pmatrix} c_5 & -s_5 & & \\ s_5 & c_5 & & \\ & & 1 & a_4 \\ & & & 1 \end{pmatrix} \begin{pmatrix} c_6 & s_6 & & \\ 0 & 1 & & \\ -s_6 & c_6 & & \\ & & & 1 \end{pmatrix} \begin{pmatrix} \alpha \\ \beta \\ \Gamma \\ 1 \end{pmatrix}$$

$$= \begin{pmatrix} c_1 s_4 & -s_1 & c_1 s_4 & 0 \\ s_1 c_4 & c_1 & s_1 s_4 & 0 \\ -s_4 & 0 & c_4 & 0 \\ 0 & 0 & 0 & 1 \end{pmatrix} \begin{pmatrix} c_5 c_6 & -s_5 & c_5 s_6 & 0 \\ s_5 c_6 & c_5 & s_5 s_6 & 0 \\ -s_6 & 0 & c_6 & a_4 \\ 0 & 0 & 0 & 1 \end{pmatrix} \begin{pmatrix} \alpha \\ \beta \\ \Gamma \\ 1 \end{pmatrix}$$

In order to evaluate the position of the welding point P, $(\alpha\beta\gamma 1) = (0\ 0\ -a_5 0)$ is given. Then, the respective axis components Px, Py and Pz of the point P may be expressed by the following equations.

$Px = -a_5(c_1 c_4 c_5 s_6 - s_1 s_5 s_6 + c_1 s_4 c_6) + Bx$ $Py = -a_5(s_1 c_4 c_5 s_6 + c_1 s_5 s_6 + s_1 s_4 c_6) + By$ $Pz = -a_5(-s_4 c_5 s_6 + c_4 c_6) + Bz$

By coordinating these, the following equations are obtained.

$Px = a_2 s_2 c_1 - e_1 s_1 + a_3 s_{2+3} c_1 + a_4 s_4 c_1 -$ $(c_1 c_4 c_5 s_6 - s_1 s_5 s_6 + c_1 s_4 c_6) a_5$ $= c_1(a_2 s_2 + a_3 s_{2+3} + a_4 s_4 - c_4 c_5 e_4 - s_4 a_7) + s_1(e_4 s_5 - e_1)$ $= c_1\{a_2 s_2 + a_3 s_{2+3} + (a_4 - a_7) s_4 - e_4 c_4 c_5\} + s_1(e_4 s_5 - e_1)$ $Py = e_1 c_1 + a_2 s_2 s_1 + a_3 s_{2+3} s_1 + a_4 s_4 s_1 - s_1 c_4 c_5 e_4 -$ $e_4 c_1 s_5 - a_7 s_1 s_4$ $= c_1(e_1 - e_4 s_5) + s_1\{a_2 s_2 + a_3 s_{2+3} + (a_4 - a_7) s_4 - e_4 c_4 c_5\}$

-continued $$Pz = a_1 + a_2c_2 + a_3c_{2+3} + a_4c_4 + e_4s_4c_5 - a_7c_4$$
$$= a_1 + a_2c_2 + a_3c_{2+3} + (a_4 - a_7)c_4 + e_4s_4c_5$$

In order to evaluate the angles $\phi$ and $\theta$ of the welding torch 27, $(\alpha\beta\gamma 1) = (0\ 0\ 1\ 0)$ is substituted in the above described equation (1), whereupon the direction cosines (tx, ty, tz) of the respective axes are obtained.

$$tx = c_1c_4c_5s_6 - s_1s_5s_6 + c_1s_4c_6$$
$$ty = s_1c_4c_5s_6 + c_1s_5s_6 + s_1s_4c_6$$
$$tz = c_4c_6 - s_4c_5s_6$$
$$txy = (tx^2 + ty^2)^{\frac{1}{2}}$$

The angles $\phi$ and $\theta$ of the welding torch are obtained as follows:

$$\phi = \tan^{-1}(ty/tx)$$
$$\theta = \tan^{-1}(txy/tz)$$

By coordinating these equations with respect to the points F and Q, the following equations are obtained.

$$Fx = a_2s_2c_1 - e_1s_1$$
$$Fy = a_2s_2s_1 + e_1c_1$$
$$Fz = a_2c_2 + a_1$$
$$Qx = a_3s_{2+3}c_1 + a_2s_2c_1 - e_1s_1$$
$$Qy = a_3s_{2+3}s_1 + a_2s_2s_1 + e_1c_1$$
$$Qz = a_3c_{2+3} + a_2c_2 + a_1$$

Thus the positional information of the respective points in the rectangular coordinates system (the robot system) is obtained. Now the coordinates conversion from the rectangular coordinates system (the robot system) to the articulated coordinates system is considered with reference to FIGS. 10 to 14. The target position on the occasion of the teaching and the interpolating control is given as that of the point P. Accordingly, it is necessary to calculate the driving amounts of the respective turning shafts based on the rectangular coordinates system.

By evaluating the coordinates of the extended point B of the welding torch 27 from (Px, Py, Pz, $\phi$, $\theta$), the respective axis components Bx, By and Bz of the point B may be obtained by the following equations.

$$Bx = Px + a_5\sin\theta\cos\phi$$
$$By = Py + a_5\sin\theta\sin\phi$$
$$Bz = Pz + a_5\cos\theta$$

Figure 10:
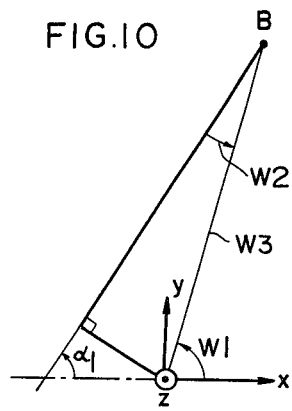

Based on the above described Bx, By, Bz, the respective components W1, W2 and W3 in FIG. 10 may be obtained by the following equations.

$$W1 = \tan^{-1}(By/Bx)$$
$$W2 = (By^2 + Bx^2 - e_1^2)^{\frac{1}{2}}$$
$$W3 = \tan^{-1}(e_1/W2)$$

Accordingly, the angle $\alpha_1$ is given by the following equation.

$$\alpha_1 = W1 - W3$$

Now the point Q is evaluated from the given torch angles $\phi$, $\theta$ and $\alpha_1$. See FIG. 11. In this case, conversion is made from the $(\alpha\beta\gamma)$ system to the (x'y'z') system. Then the intersecting point of
$-\alpha^2 + \beta^2 = e_3^2$,
the circle of $\gamma = -a_8$ and the plane of y'=0. Meanwhile, referring to the equations set forth in the following, "$\theta_c$" denotes "$\cos\theta$" and "$\theta_s$" denotes "$\sin\theta$". Likewise, "$\phi_c$" denotes "$\cos\phi$" and "$\phi_s$"

$$\begin{pmatrix}\alpha\\\beta\\\Gamma\\1\end{pmatrix} = \begin{pmatrix}\theta_c & -\theta_s & &\\0 & 1 & 0 &\\\theta_s & & \theta_c &\\0 & & & 1\end{pmatrix}\begin{pmatrix}\phi_c & -\phi_s & &\\\phi_s & \phi_c & &\\ & & 1 &\\ & & & 1\end{pmatrix}\begin{pmatrix}x'\\y'\\z'\\1\end{pmatrix}$$

$$\begin{pmatrix}\alpha\\\beta\\\Gamma\\1\end{pmatrix} = \begin{pmatrix}\theta_c\phi_c & -\theta_c\phi_s & -\theta_s & 0\\\phi_s & \phi_c & 0 & 0\\\theta_s\phi_c & -\theta_s\phi_s & \theta_c & 0\\0 & 0 & 0 & 1\end{pmatrix}\begin{pmatrix}x'\\y'\\z'\\1\end{pmatrix}$$

Accordingly, $\alpha$, $\beta$ and $\gamma$ are given by the following equations.

$$\alpha = \theta_c\phi_c x' - \theta_c\phi_s y' - \theta_s z'$$
$$\beta = \phi_s x' + \phi_c y'$$
$$\gamma = \theta_s\phi_c x' - \theta_s\phi_s y' + \theta_c z'$$

From y'=0, $\alpha$, $\beta$ and $\gamma$ may be expressed as follows:

$$\alpha = \theta_c\phi_c x' - \theta_s z'$$
$$\beta = \phi_s x'$$
$$\gamma = \theta_s\phi_c x' + \theta_c z'$$

From $\gamma = -a_8$, the following equation (2) is obtained and from $\alpha^2 + \beta^2 = e_3^2$ the following equation (3) is obtained.

$$\theta_s\phi_c x' + \theta_c z' + a_8 = 0 \quad (2)$$
$$\theta_c^2\phi_c^2 x'^2 - 2\theta_c\phi_c\theta_s x'z' + \theta_s^2 z'^2 + \phi_s^2 x'^2 = e_3^2 \quad (3)$$

By substituting $$z' = \frac{-(\theta_s\phi_c x' + a_8)}{\theta_c}$$

in the above described equation (3), the following equation is obtained.

$$(\phi_c^2 + \theta_c^2\phi_s^2)x'^2 + 2a_8\theta_s\phi_c x' + (a_8^2\theta_s^2 - e_3^2\theta_c^2) = 0$$

The discriminant WD in the above described equation may be obtained as follows:

$$WD = a_8^2\theta_s^2\phi_c^2 - (\phi_c^2 + \theta_c^2\phi_s^2)(a_8^2\theta_s^2 - e_3^2\theta_c^2)$$
$$= a_8^2\theta_s^2\phi_c^2 - a_8^2\theta_s^2\phi_c^2 + e_3^2\theta_c^2\phi_c^2 -$$
$$a_8^2\theta_s^2\theta_c^2\phi_s^2 + e_3^2\theta_c^4\phi_s^2$$

-continued $$= e_3^2\theta_c^2(\phi_c^2 + \theta_c^2\phi_s^2) - a_8^2\theta_s^2\theta_c^2\phi_s^2$$

$$= \theta_c^2\{e_3^2(\phi_c^2 + \phi_s^2\theta_c^2) - a_8^2\theta_s^2\phi_s^2\}$$

Accordingly, if and when the value of the discriminant WD is minus, this means that the point Q does not exist. On the other hand, assuming the following equations:

$$WA = \phi_c^2 + \theta_c^2\phi_s^2$$

$$WB = a_8\theta_s\phi_c$$

$$WC = a_8^2\theta_s^2 - e_3^2\theta_c^2$$

Then the x'coordinates of the point Q is given by the following equations.

$$x' = \frac{WB \pm (WB^2 - WA \times WC)^{\frac{1}{2}}}{WA}$$

The value of z' corresponding thereto is determined by the following equation.

$$z' = \frac{-(\theta_s\phi_c x' + a_8)}{\theta_c}$$

On the other hand, assuming that x' is evaluated in the region of $\theta \leq 45°$ and z' is evaluated in the region of $\theta > 45°$, then $x' = -(\theta_c z' + a_8)/\theta_s\phi_c$ is obtained from the above described equation (2) and the same is substituted in the above described equation (3). Then, the following equation is obtained.

$$(\phi_c^2 + \theta_c^2\phi_s^2)z'^2 + 2a_8\theta_c z' + \phi_c^2(a_8^2\theta_c^2 - e_3^2\theta_s^2) + a_8^2\phi_s^2 = 0$$

Assuming the following equations in the same manner as done in x' evaluating:

$$Wa = \phi_c^2 + \theta_c^2\phi_s^2 O_c^2\phi_s^2$$

$$Wb = a_8\theta_c$$

$$Wc = \phi_c^2(a_8^2\theta_c^2 - e_3^2\theta_s^2) + a_8^2\phi_s^2$$

Then the discriminant WD is obtained by the following equation.

$$WD = Wb^2 - Wa \times Wc$$

Accordingly, the X axis component Qx and the Z axis component Qz of the point Q are given by the following equations.

$$Qz = z' = \frac{-(Wb \pm \sqrt{WD})}{Wa}$$

$$Qx = x' = \frac{-(\theta_c z' + a_8)}{\theta_s\phi_c}$$

In either case, the point Q assumes two points of $Q_1(x_1', z_1')$, $Q_2(x_2' z_2')$ in the coordinates. These two different points correspond to the first state and the second state, respectively. This will be described later.

The angles $\alpha_4$ and $\alpha_5$ are determine from the coordinates (x', y', z') of the robot system and the coordinates (Qx', Qy', Qz') of the point Q with the point B deemed as the origin point. Since Qy' = 0, $\alpha_4$ is given by the following equation.

$$\alpha_4 = \tan^{-1}\frac{(-Qx)}{(-Qz)}$$

In order to evaluate the angle $\alpha_5$, (x", y", z") are further obtained from the previous robot coordinates system (x', y', z'). Then $(\alpha\beta\gamma) = (0\ 0\ -1)$ is assumed in the (x", y", z") system.

$$\begin{pmatrix} x'' \\ y'' \\ z'' \\ 1 \end{pmatrix} =$$

$$\begin{pmatrix} c_4 & -s_4 & & \\ 0 & 1 & 0 & \\ s_4 & & c_4 & \\ & & & 1 \end{pmatrix} \begin{pmatrix} \phi_c & \phi_s & & \\ -\phi_s & \phi_c & & \\ & & 1 & \\ & & & 1 \end{pmatrix} \begin{pmatrix} \theta_c & & \theta_s & \\ 0 & 1 & 0 & \\ -\theta_s & & \theta_c & \\ & & & 1 \end{pmatrix} \begin{pmatrix} 0 \\ 0 \\ -1 \\ 0 \end{pmatrix}$$

$$= \begin{pmatrix} c_4\phi_c & c_4\phi_s & -s_4 & 0 \\ -\phi_s & \phi_c & 0 & 0 \\ s_4\phi_c & s_4\phi_s & c_4 & 0 \\ 0 & 0 & 0 & 1 \end{pmatrix} \begin{pmatrix} -\theta_s \\ 0 \\ -\theta_c \\ 0 \end{pmatrix}$$

Accordingly, x" and y" are given by the following equations.

$$x'' = -c_4\phi_c\theta_s + s_4\theta_c$$

$$y'' = \phi_s\theta_s$$

Figure 12:
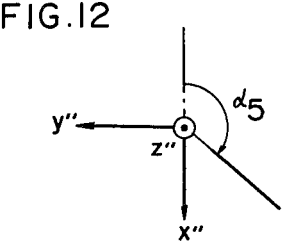
Figure 11:
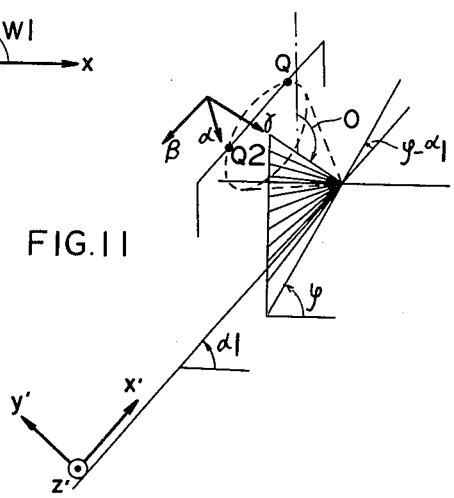
Figure 13:
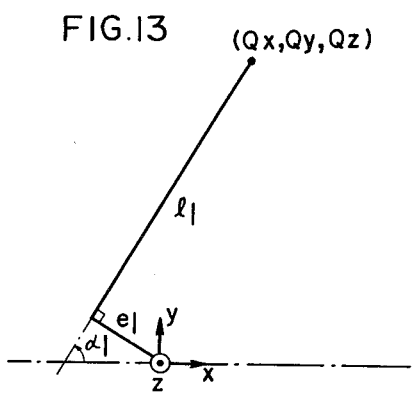
Figure 14:
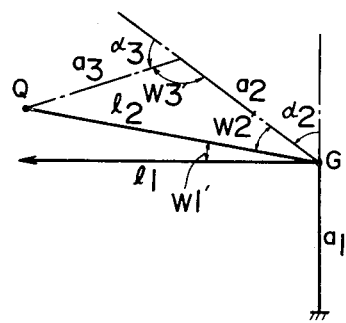

Assuming that the reference line of the angle $\alpha_5$ is away from the vertical line by the angle as shown in FIG. 12, the angle $\alpha_5$ is given by the following equation.

$$\alpha_5 = \tan^{-1}\left(-\frac{\phi_s\theta_s}{c_4\phi_c\theta_s - s_4\theta_c}\right)$$

When the position of the point Q is evaluated in the absolute coordinates system in order to evaluate the angles $\alpha_2$ and $\alpha_3$, the respective axis components Qx, Qy, Qz of the Q are evaluated by the following equations.

$$Qx = Bx + x'\cos\alpha_1$$

$$Qy = By + x''\sin\alpha_1$$

$$Qz = Bz + z'$$

On the other hand, since the point G (see FIG. 14) is $(-e_1\sin\alpha_1, e_1\cos\alpha_1, a_1)$, the length components $a_1$, $a_2$ and the angle component W1 are expressed by the following equations.

$$l_1 = \{(Qx + e_1s_1)^2 + (Qy - e_1c_1)^2\}^{\frac{1}{2}}$$

$$l_1 = \{l_1^2 + (Qz - a_1)^2\}^{\frac{1}{2}}$$

$$W1' = \tan^{-1}\left(\frac{Qz - a_1}{l_1}\right)$$

Assuming $WA = (a_2^2 + l_2^2 - a_3^2)/2a_2l_2$, then the angle component $W2'$ is given by the following equation.

$$W2' = \cos^{-1}(WA) = \tan^{-1}\left(\frac{(1-WA^2)^{\frac{1}{2}}}{WA}\right)$$

Furthermore, assuming $WB = (a_2^2 + a_3^2 - l_2^2)/2a_2a_3$, then the angle component $W3'$ is given by the following equation.

$$W3' = \tan^{-1}\left(\frac{(1-WB^2)^{\frac{1}{2}}}{WB}\right)$$

Accordingly, the angles $\alpha_2$ and $\alpha_3$ are given by the following equations.

$$\alpha_2 = (\pi/2) - W1 \pm W2$$

$$\alpha_3 = \pm(\pi - W3)$$

Thus, conversion from the rectangular coordinates to the articulated coordinates is made; however, as described previously, in the embodiment shown the angles $\alpha_5$ and $\alpha_4$ and $\alpha_2$ and $\alpha_3$ can be selected in two ways, respectively. Therefore, in calculating the positional information in the $\alpha_1$ to $\alpha_5$ system at the step S19 of the flow diagram shown in FIG. 3, calculation is made in accordance with the state of the up-down flag UDF. More specifically, in the case where the flag UDF is the logic one, calculation is made of the above described angles $\alpha_2$ to $\alpha_5$ so that the first state (U) is attained, whereas in the case where the flag UDF is the logic zero conversely calculation is made so that the second state (D) is attained.

Now the operation of the automatic mode of the embodiment shown in FIG. 2 and thus in FIG. 1 will be described with reference to FIG. 5. In the case of the automatic mode, the mode selecting switch 101 in the operation panel 100 is turned to the automatic mode A. Then the start button 103 is depressed. The central processing unit 31 reads the target positional information previously taught from the memory 33 at the step S31. Then it is determined at the step S33 whether the critical zone flag CZF has been set based on the read teaching information. More specifically, at the step S33 it is determined whether the target value just read is within the critical zone shown in FIG. 6. In the case where the target position at this time is not in the critical zone, the central processing unit 31 determines at the following step S35 whether the previous up-down flag UDF is the same as the current up-down flag UDF. More specifically, at the step S35 it is determined whether it is necessary to reverse the state between the previous target value and the current target value. In the case where reversion is necessary, i.e. in the case where the previous flag and the current flag are different, then at the following step S37 it is determined whether the previous commanded value was in the critical zone. In the case where it is determined at the step S37 that the previous commanded value is not in the critical zone, this means that such reversion of the state cannot be made and processed as an error. In the case where the previous commanded value is in the critical zone, the central processing unit 31 is responsive to the up-down flag UDF included in the teaching information just read out to determine the state at the step S39. Thus it would be appreciated that the case where the state can be reversed is very limited. Now the cases where such reversion can be made will be described with reference to table.

TABLE

| previous state | current state | flag UDF | reversion possible? | Ⓐ | Ⓑ | Ⓒ | Ⓓ |
|---|---|---|---|---|---|---|---|
| U | U | U | x | | x | | |
|   | Cu | U | x | x | | | |
|   | Cd | U | x | x | | | |
|   | D | err | | | | x | |
| Cu | U | U | x | | x | | |
|   | Cu | U | x | x | | | |
|   | Cd | U | x | x | | | |
|   | D | D | O | | | | x |
| Cd | U | U | O | | | | x |
|   | Cu | D | x | x | | | |
|   | Cd | D | x | x | | | |
|   | D | D | X | | | x | |
| D | U | err | | | | x | |
|   | Cu | D | x | x | | | |
|   | Cd | D | x | x | | | |
|   | D | D | x | | | x | |

Figure 5:
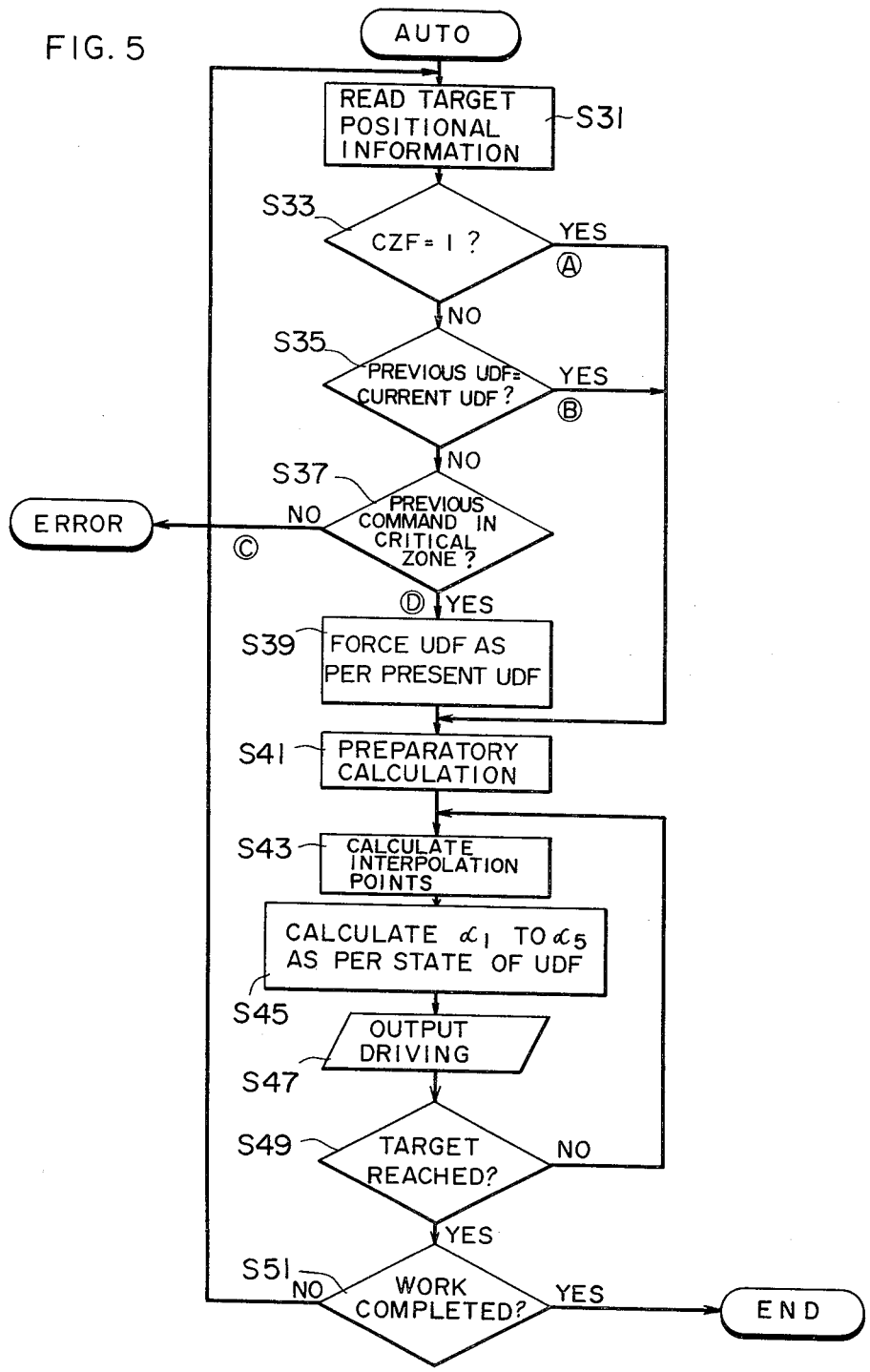

Referring to table, Ⓐ, Ⓑ, Ⓒ, and Ⓓ correspond to Ⓐ, Ⓑ, Ⓒ and Ⓓ in the FIG. 5 flow diagram. More specifically, referring to the FIG. 5 flow diagram, as the cases of becoming Ⓐ the eight cases as marked X in the table may be considered; as the cases of becoming Ⓑ the four cases may be considered; and as the cases of becoming Ⓒ the two cases may be considered. Out of them the cases in which the state may be reversed, i.e. the cases of becoming Ⓓ are only two cases or states. More specifically, one of them is the case in which the previous state is the critical zone up (Cu) and the current state is the second state (D) and the flag UDF indicates the logic zero, i.e. the second state (D) and the other of the above described two cases is the case in which the previous state is the critical zone down (Cd) and the current state is the first state (U) and the flag UDF indicates the logic one, i.e. the first state (U). Meanwhile, such reversible conditions may be changed or increased as necessary.

Thus at the step S39 the state is reversed where possible. Referring to FIG. 5, as in the cases of Ⓐ and Ⓑ, at the step S41 a preparatory calculation is made. The preparatory calculation step is aimed to make calculation necessary for an interpolating control, for example. Such an interpolating control may be a linear interpolation, an arcuate interpolation or the like. However, since such interpolating control is well known to those skilled in the art, the same will be briefly described. More specifically, in the case of a linear interpolation, successive interpolation pitches of inner interpolation or outer interpolation are calculated based on the commanded speeds with respect to the two points taught in the XYZ system. In the case of the interpolation of the turning and attitude of the torch, equiangular interpolation is individually performed with respect to each of the angles $\phi$ and $\theta$ of the welding torch 27. As regards the position in the case of the arcuate interpolation, a plane including a circle is determined from the three points given in the XYZ system and the center point and the radius are evaluated on the above described plane, whereupon the central angle is interpolated and the respective interpolation pitches on the arcuate curve are evaluated in the XYZ system. Thus other preparatory calculations are performed for the purpose of interpolation. Thereafter the central processing unit 31 makes at the step S41 the successive interpolating points based on the interpolation pitches evaluated by the preparatory calculations. Then at the following step S45 the positions of the welding point P in the $\alpha_1$ to $\alpha_5$ system are calculated in accordance with the up-down flag UDF forced or just read out at the previous step S39. The driving circuits 351 to 355 of the respective axes (angles) drive the respective servomotors based on the positional information thus calculated.

At the same time the central processing unit 31 determines at the step S49 whether the interpolating points calculated at the above described step S43 has reached the target position intially taught. If the said target position has not yet been reached, at the step S43 the interpolating points are in succession calculated. If and when the target point has been reached as a result of calculation of the interpolating points, it is determined at the step S51 whether the work has been completed, i.e. the welding work has been completed, based on the null signal obtained from the respective driving circuits 351 to 355 of the successive output driving. If and when it is determined that the work has been completed, then a series of automatic mode operation is terminated, whereas otherwise the program returns to the step S31 to read a new target value. At the step S47 the successive interpolating points may be commanded at each expected timing based on the said speeds or the same may be commanded in accordance with the above described null signal.

Various manners in which the two states can be assumed at the same position in the articulated robot may be considered. For example, the turning arm 17 in FIG. 1 can be provided to be turnable by the shaft which is orthogonal to the shaft 9 with respect to the turning arm 11. In addition, in FIG. 1, for example, although the shaft 23 is provided to be rotatable with respect to the turning wrist 21, conversely the turning wrist 21 may be a rotating shaft and a tuning shaft may be provided at the end of the wrist 21. More specifically, if there are three articulations, then a control to any positions can be made and in such a case, if a target position is determined, various types of two states that can be assumed may be readily considered. It is pointed out that the present invention can be applied to any of such manners.

Referring to FIG. 1, the wrist 21 is provided to be articulated to the turning arm 17. However, such base point need not be necessarily position controlled by way of an articulation type control and alternatively a control may be made in the rectangular coordinates system. For example, a position control may be made in the rectangular coordinates system up to the point or axis corresponding to the shaft 19 in FIG. 1, whereupon a control may be made of the wrist 21 and the shaft 23 in the articulated coordinates system. By thus employing both the rectangular coordinates system and the articulated coordinates system, such employment would be advantageous from the standpoint of inertia as compared with a case where a control is made all in the articulated coordinates system shown in FIG. 1.

Figure 15:
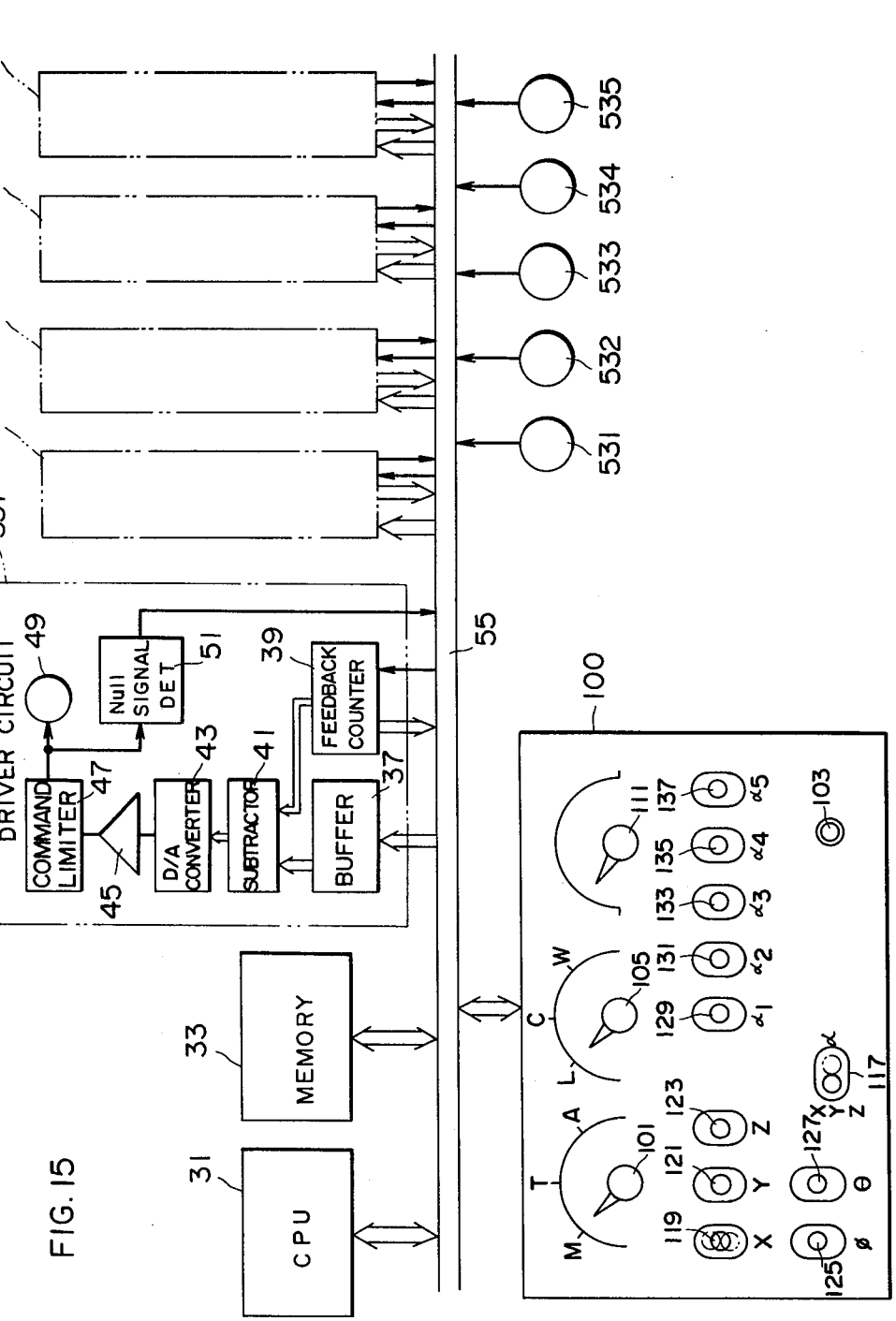
FIG. 15 is a block diagram showing an outline of another embodiment of the present invention.

FIG. 15 is a block diagram showing another embodiment of the present invention. The FIG. 15 embodiment comprises a modification in the operation 100 as compared with the previously described FIG. 2 embodiment. More specifically, the operation panel 100 shown in FIG. 15 comprises a second mode selecting switch 139 in lieu of the depression button switches 105, 107 and 109 of the FIG. 2 embodiment. At the same time, the depression button switch 115 of the FIG. 2 embodiment has been omitted. The reason is that the embodiments set forth in the following has been adapted to dispense with entry and processing of information concerning the previously described "critical zone". The second mode selecting switch 105 is aimed to selectively set any of the linear interpolating operation (L), the arcuate interpolating operation (C) or the weaving operation (W).

Now that the structural features of the embodiments were described in the foregoing, the operation of the FIG. 15 embodiment and thus another embodiment of the FIG. 1 embodiment will be described with reference to the flow diagrams shown in FIGS. 16 to 19 and the diagrams shown in FIGS. 7 to 14 and 22.

First the manual mode for the teaching operation will be described. The central processing unit 31 comprises a timer for receiving a clock from a clock source provided inside thereof and the timer is responsive to the clock to provide an output for every predetermined time period. The central processing unit 31 is responsive to the timer output, if obtained, to interrupt the same at the step 101. At the first step S103 it is determined whether the manual switches 119, 121, 123, 125 and 127 and 129, 131, 133, 135 and 137 of the respective axes of the operation panel 100 are all in the neutral position. In other words, at the step S103 it is detected whether any of the manual switches 119 to 137 has been operated. At the following step S105 it is determined whether the system selecting switch 117 (FIG. 15) has been turned to the $\alpha$ system. More specifically, although the inventive articulated robot has been structured such that the first state in which the articulation angle is bent in one direction and the second state in which the articulation angle is bent in the other direction may be assumed, in the case where only either the first state or the second state is assumed, i.e. there is no reversion of the state, the system selecting switch 117 is in advance turned to the XYZ system. The reason is that in more cases the welding line of the workpiece, not shown, has been extended in the directions orthogonal to each other when the information is commanded in the rectangular coordinates system and accordingly it is easier for an operator to move the torch 27 (FIG. 1) along the welding line and to make interpolating calculations and the like. Conversely, in the case where there is a change of the articulation angle from the first state (or the second state) to the second state (or the first state), i.e. the state is to be reversed, the system selecting switch 117 is turned to the $\alpha$ system. Thus, the embodiment has been adapted such that two ways of manual operations of the articulation angle and thus of the teaching may be made.

Accordingly, if and when it is determined at the step S105 that the system selecting switch 117 has been turned to the XYZ system, then at the following step S107 the commanded value is increased or decreased in association with the operation direction of the switch operated in the XYZ system. More specifically, at the step S107 the commanded value (the fundamental amount) corresponding to the above described timer time period is increased or decreased based on the operation direction (U or D, C or CC) of the operated manual switches 119, 121, 123, 125 or 127 and the speed set by the speed setting unit 111 based on the signal from the operation panel 100. In the case where the commanded value is thus given in the XYZ system, at the following step S109 the coordinates conversion is made from the XYZ system to the $\alpha$ system. Such coordinates conversion has been described in detail previously together with the coordinates conversion at the step S115 to be described subsequently. Meanwhile, on the occasion of coordinates conversion at the step S109 it is necessary to take into consideration the signs of the articulation angles $\alpha_3$ and $\alpha_5$. More specifically, although the articulation angle $\alpha_3$ has a controllable range of say 270°, the state (the first state) bent in one direction with say 180° (i.e. a straight line state of the arms 11 and 17) as a boundary is denoted as $-$, whereas the state (the second state) bent in the other direction is denoted as $+$. Likewise, $\alpha_5$ has a rotatable range of 360°, in which the same is denoted as $-$ in the first state and is denoted as $+$ in the second state.

Thus in the case where the system selecting switch 117 is turned to the XYZ system, the commanded value in the XYZ system given at the step S107 is converted into the $\alpha$ system at the step S109 by taking into consideration the signs of the above described $\alpha_3$ and $\alpha_5$, whereupon the output is provided at the following step S111 to controllably drive the respective articulation angles.

In the case where a control is made in which the above described reversion of the state is made, the system selecting switch 117 is turned to the $\alpha$ system. Then at the step S113 the commanded value corresponding to the above described timer time period is increased or decreased based on the operation directions of the operated switches 129, 131, 133, 135 or 137 and the speed set by the speed setting unit 117 in the $\alpha$ system. In the case where the commanded value is given in the $\alpha$ system as described above, the coordinates conversion is made from the $\alpha$ system to the XYZ system at the following step S115 for the purpose of the interpolating operation to be described subsequently. Such coordinates conversion has been described previously. Then the output is obtained in accordance with the commanded value of the $\alpha$ system given at the step S113 to make driving at the step S111. In the case of driving in the $\alpha$ system, the central processing unit 31 provides the positional information of $\alpha_1$ to $\alpha_5$ to the respective corresponding driving circuits 351 to 355. The respective driving circuits 351 to 355 are responsive to the command from the central processing unit 31 to control the respective articulation angles $\alpha_1$ to $\alpha_5$ shown in FIG. 1.

Figure 16:
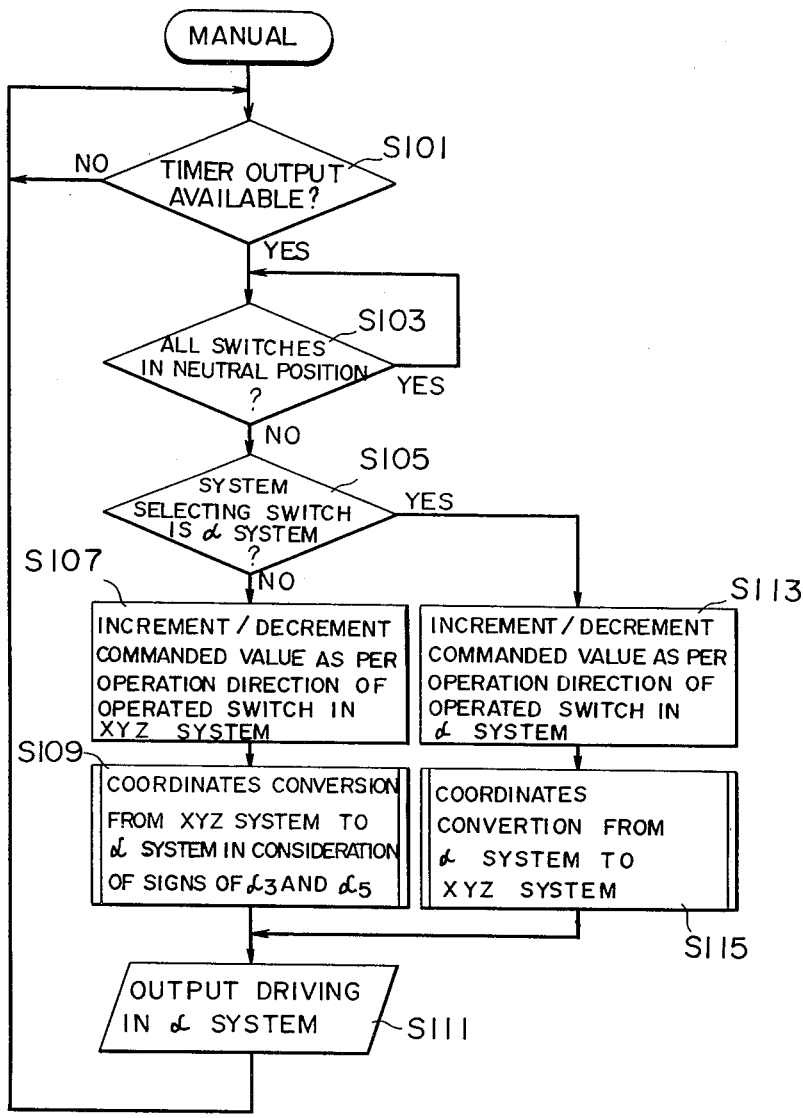
FIGS. 16 to 19 are flow diagrams for explaining the operation of the embodiment of the present invention.
Figure 17:
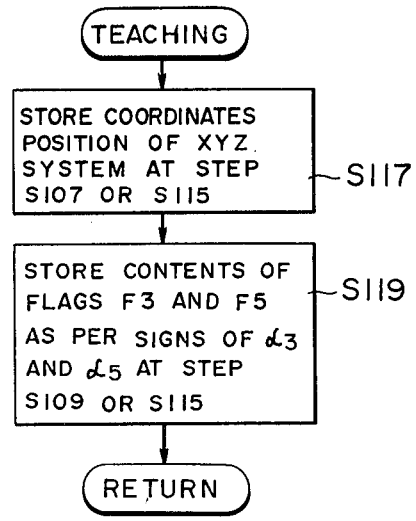

In the case of the teaching operation, the start button 103 of the operation panel 100 is depressed. More specifically, by turning the mode selecting switch 101 to the manual mode M and by depressing the start button 103, the central processing unit 31 interrupts the teaching operation. The central processing unit 31 is responsive to such interruption to store the positional information and the contents in the flags F3 and F5 associated with the signs of $\alpha_3$ and $\alpha_5$ at that time in the predetermined storing areas of the memory 33. More specifically, on the occasion of the teaching operation the central processing unit 31 stores at the step S117 the coordinates position in the XYZ system at the previous steps S107 and S115 (FIG. 16). Thus, on the occasion of the teaching operation the XYZ system is stored. The reason is that the same is more convenient for the interpolating calculations as described above. Then at the step S119 the contents of the flags F3 and F5 associated with the signs of $\alpha_3$ and $\alpha_5$ at the previous step S109 or S115 (FIG. 16) are stored. For example, if and when the signs of $\alpha_3$ and $\alpha_5$ are $-$, the flags F3 and F5 are turned to the logic zero and the same is stored, whereas conversely if and when the signs of $\alpha_3$ and $\alpha_5$ are $+$, the flags F3 and F5 are turned to the logic one and the same is stored.

Now referring to FIG. 18, the operation in the automatic mode of the embodiment will be described. On the occasion of the automatic mode, the mode selecting switch 101 in the operation panel 100 is set to the automatic mode A. Then the start button 103 is depressed. Accordingly, the central processing unit 31 resets at the step S121 the step counter, not shown, implemented by appropriate location of the memory 33 and increments at the step S123 the above described step counter. Then at the step S125 the central processing unit 31 reads out from the memory 33 the command information of the step M incremented at the step S123 out of the respective steps previously taught and loads the same. At the following step S127 it is checked whether the linear interpolation command has been included in the command information of the step M thus loaded. This can be determined based on whether indentifying information representing linear interpolation has been loaded together with the commanded positional information.

In the case of the linear interpolation, at the following step S129 the target position is selected to be the command position of the step M and at the step S131 linear interpolation is performed.

Figure 19:
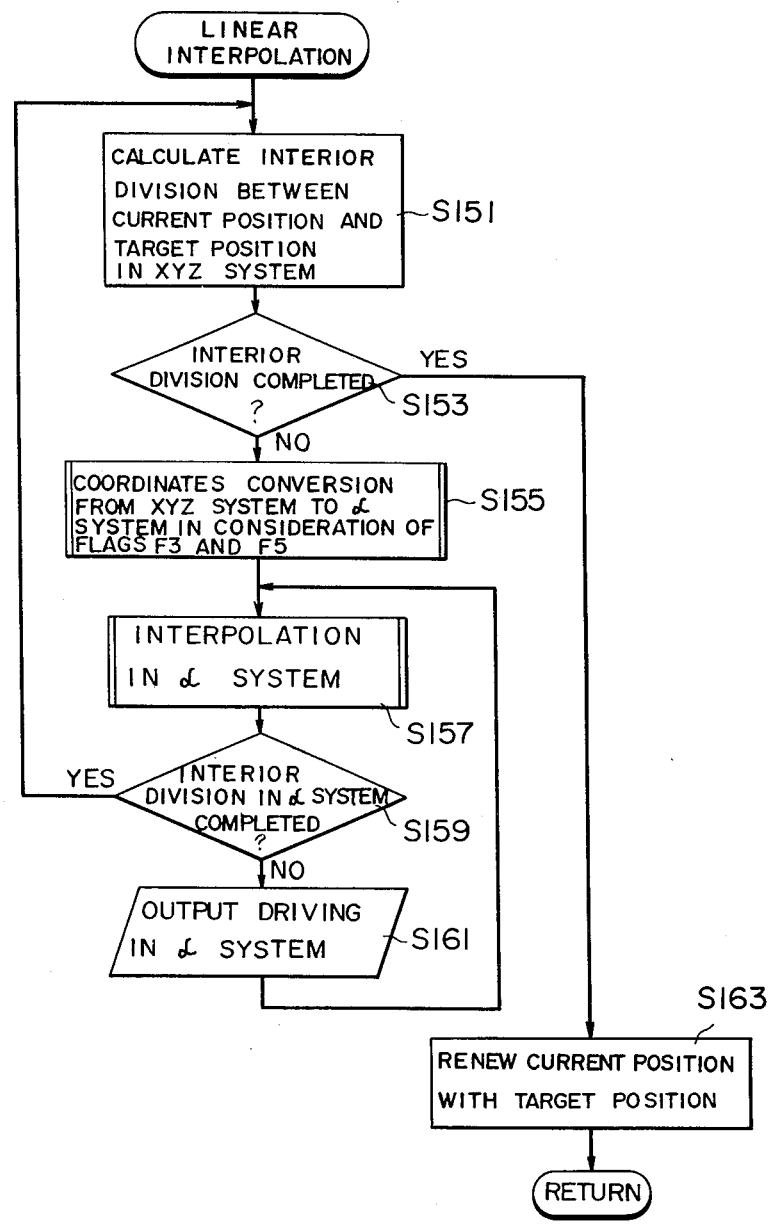

Now referring to FIG. 19, a subroutine of linear interpolation will be described. In the subroutine of linear interpolation, at the first step S151 interior division between the current position and the target position is calculated in the XYZ system. More specifically, interior division $\Delta S$ = commanded speed V × time t (say 0.2 seconds) is assumed and a linear interpolating point is calculated at each $\Delta S$. At the following step S153 it is determined whether such interior division calculation has been completed. Otherwise, at the step S155 coordinates conversion from the XYZ system to the $\alpha$ system is made in consideration of the flags F3 and F5 as at the previous step S109 (FIG. 16). At the following step S157 interpolating calculation is made in the $\alpha$ system. More specifically, at the step S151 a linear interpolating point is calculated at every 0.2 seconds to evaluate the interior division $\Delta S$, but in order to smoothly connect between $\Delta S$ interpolation is made therebetween in the $\alpha$ system. More specifically, the portion between the two points spaced apart from each other by $\Delta S$ is interpolated in an equiangular manner with respect to the respective axes of $\alpha_1$ to $\alpha_5$. As a result, more smooth control can be made. At the step S159 it is determined whether interior division in the $\alpha$ system at the step S157 is completed. If so, the program returns to the previous step S151 and otherwise at the following step S161 the output driving is made in the $\alpha$ system. Meanwhile, if and when it is determined at the previous step S153 that interior division is completed, the current positional information is renewed by the target positional information and the program returns to the main routine at the step S163.

Figure 18:
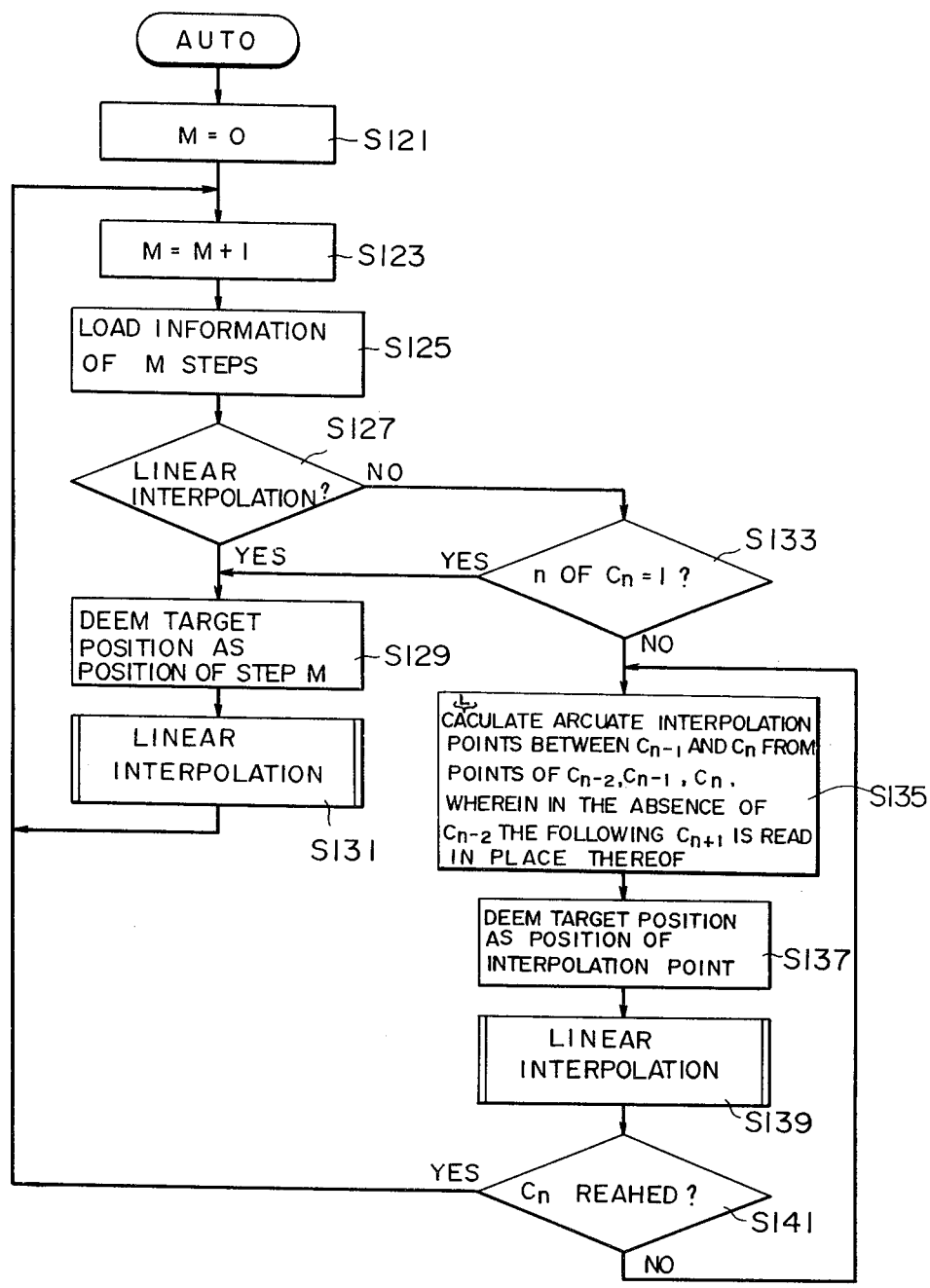

Referring to FIG. 18, if and when it is determined at the step S127 that interpolation is not of linear interpolation, then at the following step S133 it is determined whether a first arcuate interpolation command out of a series of pieces of arcuate interpolation command information is obtained, i.e. whether n=1 of the commanded point $C_n$. If n=1, then this means that linear interpolation must be made up to that point and the program proceeds to the previous step S129. If and when three or more pieces of arcuate interpolating information is successfully obtained, at the following step S135 arcuate interpolating points are calculated. However, in the case of arcuate interpolation of the second point (say $C_2$ in FIG. 22), the next arcuate interpolating point (say $C_4$ in FIG. 22) is calculated as the first arcuate interpolating point. Then the thus calculated interpolating point position is set as a target position at the step S137. In the embodiment shown at the step S139 linear interpolation is further made therebetween for the reason set forth in the following. Although at the step S135 an arcuate interpolating point is calculated such that the pitch may be 5mm, for example, the portion between the calculated interpolating points is further subjected to linear interpolation, thereby to enable more smoothing control. Calculation for arcuate interpolation requires more operation processing time period as compared with that for linear interpolation but in order to enable utilization of a less expensive microcomputer by saving such operation time period the embodiment is adapted to make interpolation such that the arcuate interpolating point is relatively rough while the portion between the interpolating points is much finer using the linear interpolation routine (FIG. 19), thereby to enable a control of an excellent precision using a less expensive computer. Upon completion of the linear interpolation, at the storing step S141 it is determined whether the commanded position $C_n$ for arcuate interpolation has been reached. If not, the program returns to the previous step S123, whereby the step counter, not shown, is incremented. Otherwise, the program returns to the step S135.

Meanwhile, both in the above described case of linear interpolation and in the case of arcuate interpolation equiangular interpolation is made independently for each of the angles $\phi$ and $\theta$ of the torch 27 (FIG. 1).

Figure 20:
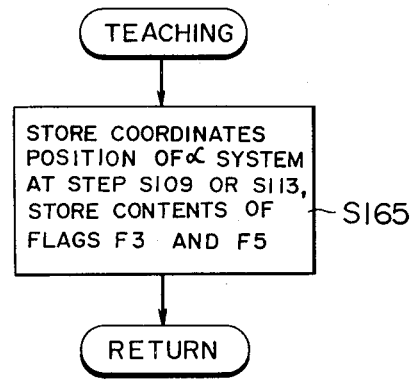
FIGS. 20 and 21 are flow diagrams for explaining the operation of a further embodiment of the present invention.

FIG. 20 is a flow diagram showing the teaching mode of a further embodiment of the present invention. The embodiments shown in FIGS. 20 and 21 to be described subsequently are modifications of the embodiment shown in FIGS. 16 to 18. The second embodiment has the same manual mode as that of the previously described FIG. 16 embodiment. On the occasion of the teaching operation, as is different from the previously described embodiment (FIG. 17), the teaching operation is interrupted, whereupon at the step S165 the coordinates position of the $\alpha$ system of the previous step S109 or S113 (FIG. 16) is stored. Thus, in the embodiment shown, storing in the teaching operation is made in the $\alpha$ system.

Figure 21:
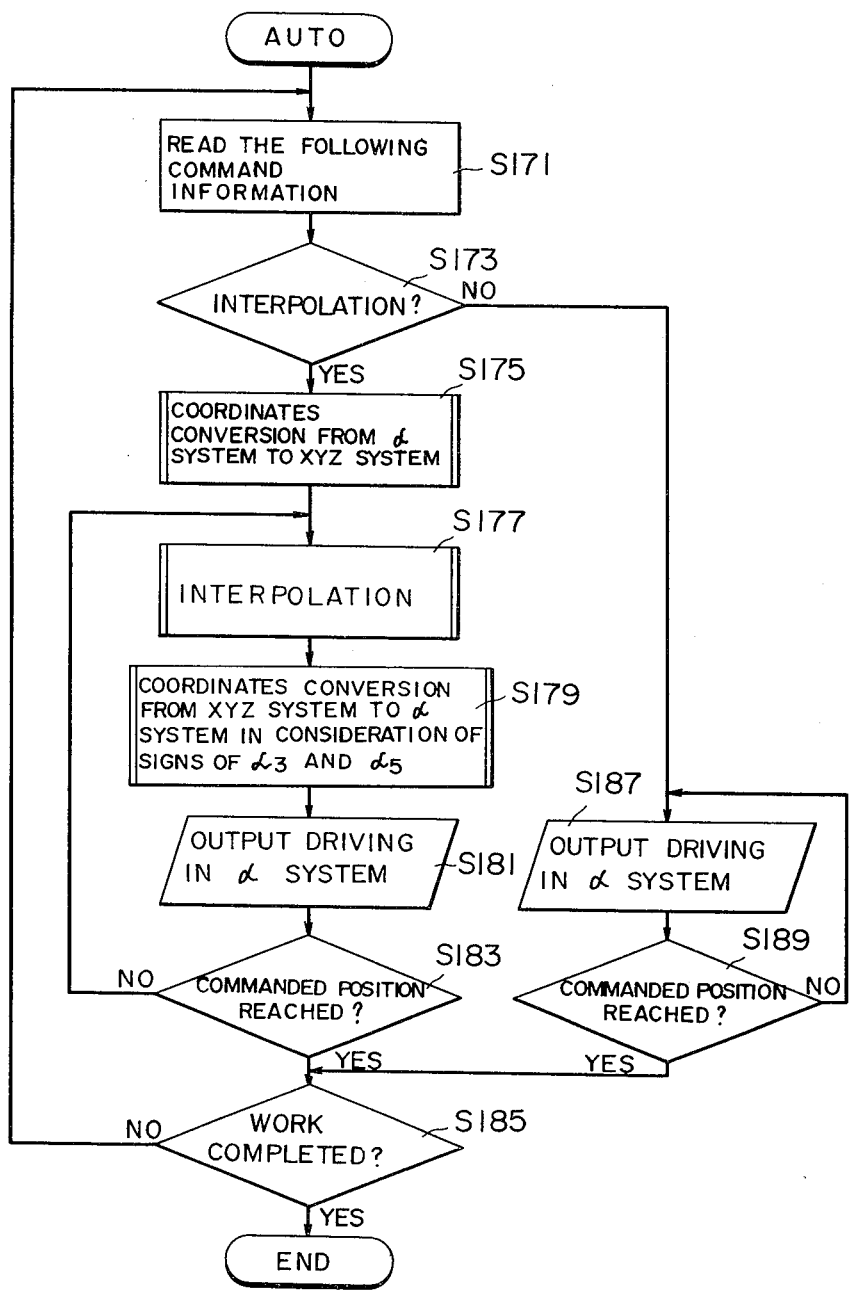

In the case of the embodiment shown, the automatic mode is controlled in accordance with the flow diagram shown in FIG. 21. The operation of the automatic mode of the embodiment shown will be readily understood but the same will be described in brief. First at the step S171 the following commanded information is read out and at the step S173 it is determined whether interpolation command information is included in the commanded information. In the absence of the interpolation command, at the steps S187 and S189 the output is obtained in the $\alpha$ system as it is, so that the respective axes $\alpha_1$ to $\alpha_5$ are driven.

In the case where the interpolation command information is included, at the following step S175 coordinates conversion is made from the $\alpha$ system to the XYZ system. Thus interpolation calculation (see FIGS. 18 and 19) is made at the step S177 in the converted XYZ system. At the step S179 coordinates conversion is made from the XYZ system to the $\alpha$ system for the purpose of output driving in the $\alpha$ system. In such a case, of course the signs of $\alpha_3$ and $\alpha_5$ is taken into consideration. At the steps S181 and S183 the respective axes $\alpha_1$ to $\alpha_5$ are controllably driven. If and when the work is completed at the step S185, the operation in the automatic mode is completed.

According to the above described and subsequently described embodiments, the weaving mode W may be selected by the switch 139 of the operation panel 100 to command the weaving interpolation. In such a case the coordinates system may be either the $\alpha$ system or the XYZ system and the positional information of the start point and end point of one cycle of the weaving is taught. In the automatic mode the position is commanded so that the same is repeated in the XYZ system between the start point and the end point of the weaving. Repetition of the weaving operation in the XYZ system is disclosed in Japanese Patent Laying Open Gazette No. 14139/1978 i.e. U.S. Pat. No. 4,179,602 issued to Maruyama et al. and assigned to the same assignee of the present invention. In the case of the present embodiment, both the linear interpolation and the arcuate interpolation can be made between the start point and the end point.

Even in accordance with any of the above described embodiments, a free curve as shown in FIG. 22 can be easily taught and position controlled by playback. Referring to FIG. 22, "L" comprises command information of the linear interpolation, and "C" means inclusion of the command information of circular or arcuate interpolation.

Furthermore according to the present embodiment, even in the case of welding the welding line 201 of the workpiece 200 shown in FIG. 23, it is possible to prevent a conduit tube coupled to the torch 27 from being twisted in the FIG. 1 embodiment. More specifically, in the embodiment shown the torch 27 is provided to be inclined with a given angle with respect to the shaft 23 in FIG. 1 and the shaft 23 is made turnable in the range of the angle ($\alpha_4$) of 180°, for example, while a rotating angle ($\alpha_5$) of the torch 27 is selected to be 360°, whereby it is possible to teach an attitude in which the conduit tube, not shown, extending from the rear end of the torch 27 is not twisted even after the welding is performed along the full periphery of the welding line 201 on the occasion of making arcuate interpolation in a fillet welding shown in FIG. 23. In addition, in order to enable the above described teaching operation, as is different from the FIG. 1 embodiment, the tip end of the torch 27 or the welding point P1 may be dislocated from the point P2 on the axial line of the shaft 23 as shown in FIG. 24. Thus, in the case where the welding point of the torch 27 is dislocated from the axis of the shaft 23, an error $\overline{P1P2}$ caused by such dislocation is corrected. By thus employing a structure shown in FIG. 1, even in welding such welding line 201 as shown in FIG. 23, an attitude for preventing the conduit tube from being twisted can be taught and reproduced without interference of the rotating shaft 23 and the fixture 25 with the workpiece 200.

Meanwhile, in teaching the information such that welding is made on the circular welding line shown in FIG. 23, it would be readily appreciated that in actuality $C_1$ out of the positions $C_1$, $C_2$ and $C_3$ in FIG. 23 need be again taught or the point in the vicinity thereof (the so-called dummy point) need be taught.

Figure 25:
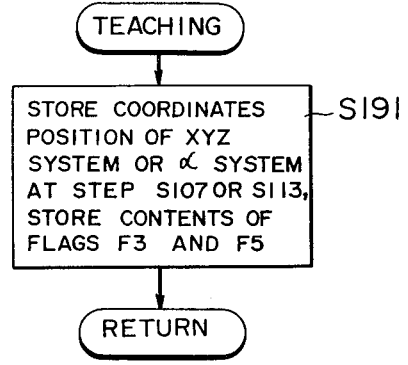
FIGS. 25 and 26 are flow diagrams for explaining the operation of the further embodiment of the present invention.
Figure 26:
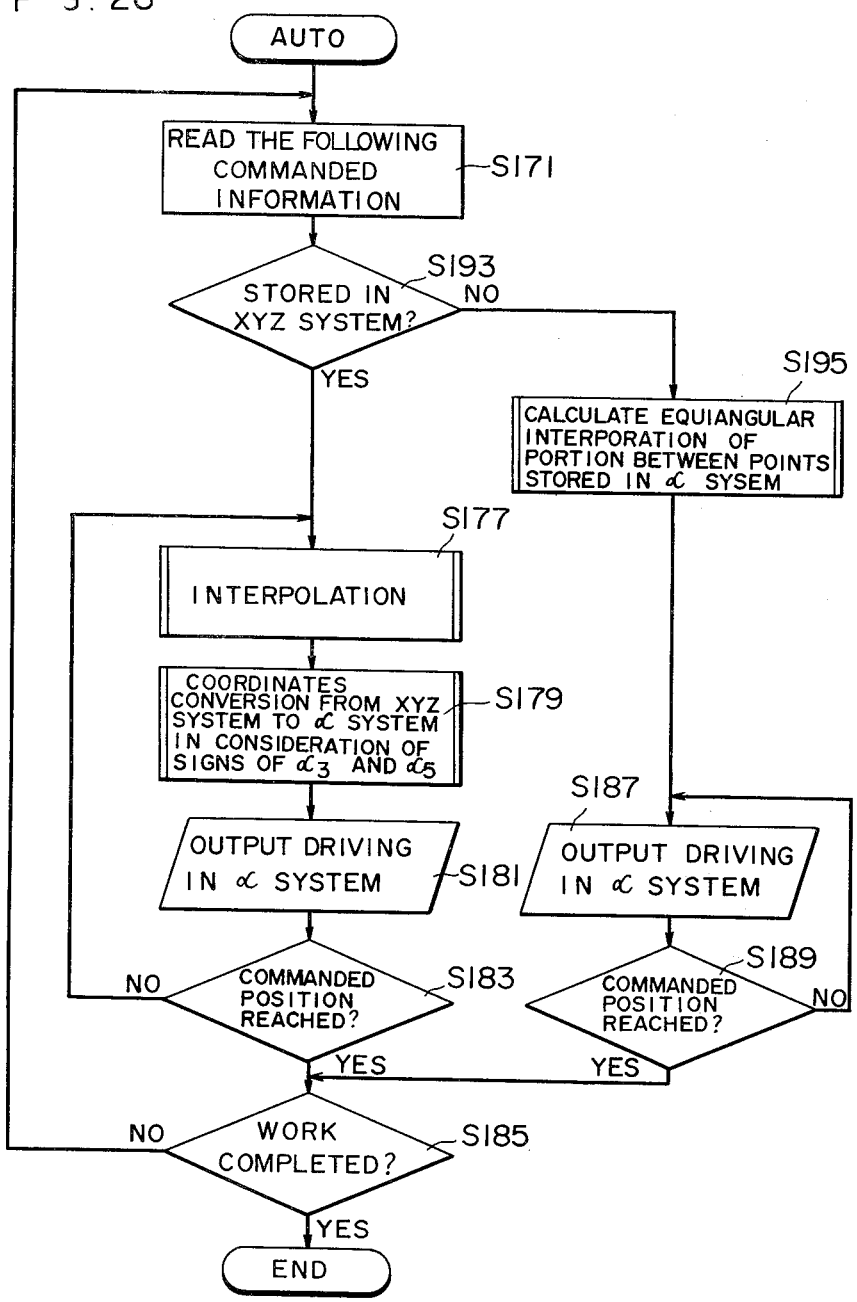

By way of a further embodiment, in the teaching mode the information in the XYZ system when the teaching is made in the XYZ system and the information of the $\alpha$ system in the case where the teaching is made in the α system need be stored respectively as shown in the step S191 in FIG. 25. In the automatic mode, as shown in the step S193 in FIG. 26 partially changed as compared with that in FIG. 21, interpolation is necessarily made in the case where information is stored in the XYZ, as described previously. On the other hand, in the case where the information is stored in the α system, it is determined that the sign of the flag F3 or F5 is changed and the portion between the points stored in the α system is equispace interpolated at the step S195 for each control angle, whereupon interpolation information is outputted to drive the respective control axes. The detail of the equispace interpolation is the same as that of the previously described step S157.

As described in the foregoing, according to the embodiment in discussion, in an articulated robot the state of intersecting turnable arms can assume two states of the first state and the second state. Conventionally it could occur that the turnable arms collide with a workpiece depending on the geometry of a workpiece and the position of the welding point, for example, which necessitated a change in the position of the workpiece; however, according to the embodiment shown, since the state of such turnable arms can be reversed as in the case of the previously described embodiments, such collision can be avoided without changing the position of the workpiece. In addition, as is different from the previously described embodiments, such change among the two states can be taught by simply changing from the rectangular coordinates system to the articulated system, with the resultant simplified operation.

In addition, referring to the appended claims, by "at least two articulated angles" it is meant that when a given articulation angle changes among the above described two states all of the articulation angles associated with a control of the said one articulation angle are meant and $\alpha_3$ and $\alpha_5$ per se in the embodiment are not meant, as a matter of course.

The embodiment shown in FIGS. 27 to 33 comprises an improvement in an articulated robot to be controlled in the above described manner. In particular, the embodiment comprises an improvement in a power system for turning and rotating the respective arms.

As well known, an articulated robot comprises a first arm, and a second arm provided at the tip end of the first arm so as to be turnable with respect to the first arm, and a mechanism for controlling the turning angle between these two arms with a prime mover such as a motor. The requirements in such articulated robot are (i) an increased range of the turning angle, (ii) precise control of the turning angle, (iii) compact structure with little protruding portion to avoid collision with anything therearound, and (iv) smooth moving of the arms with little noise. The embodiment set forth in the following is directed to an articulated robot improved to meet such requirements. Accordingly, by applying the above described control in such articulated robot, an improved articulated robot is provided which is far satisfactory as compared with a conventional one.

Figure 27:
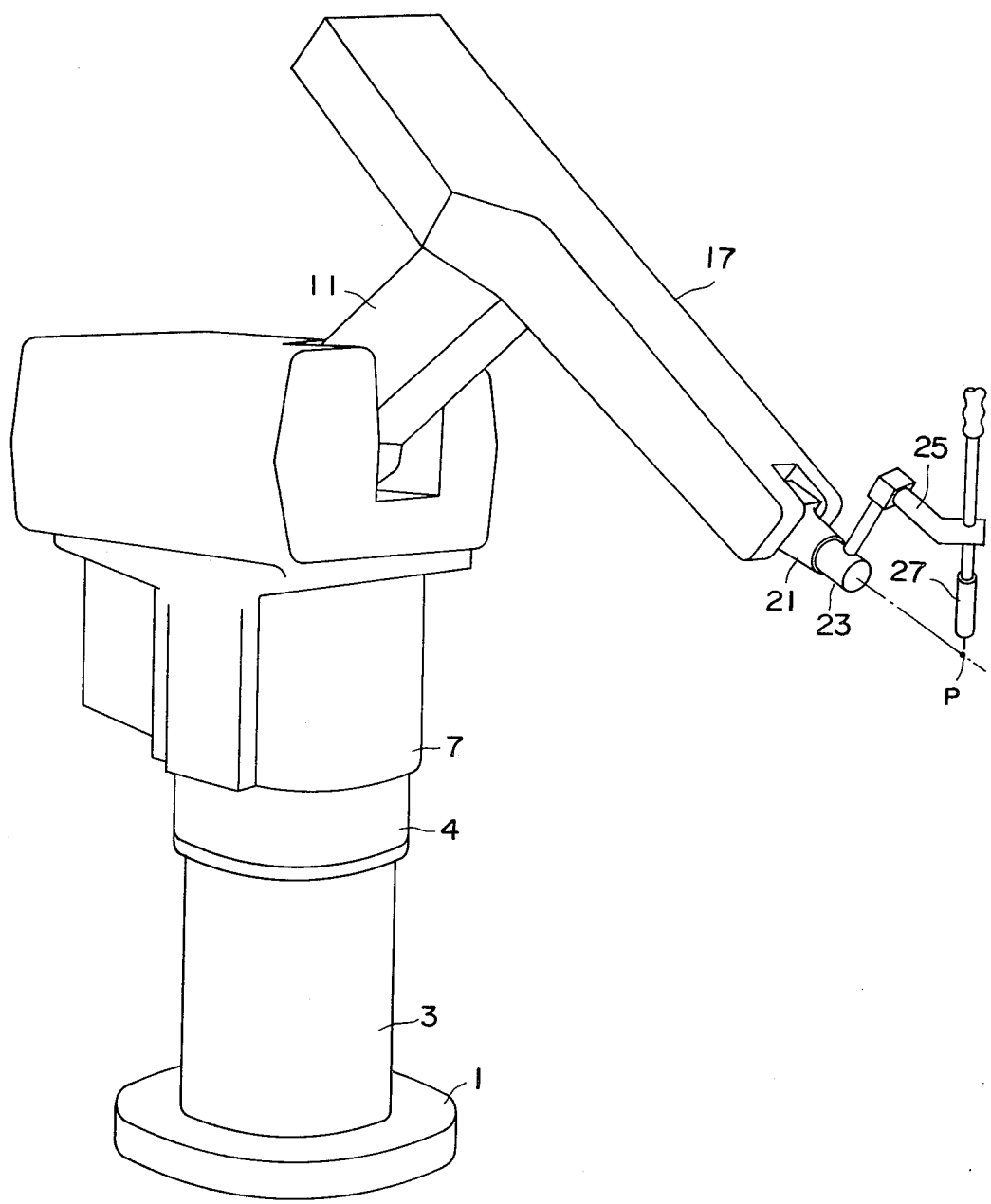
FIG. 27 is a perspective view of another example of the articulated robot in which the present invention can be employed.
Figure 28:
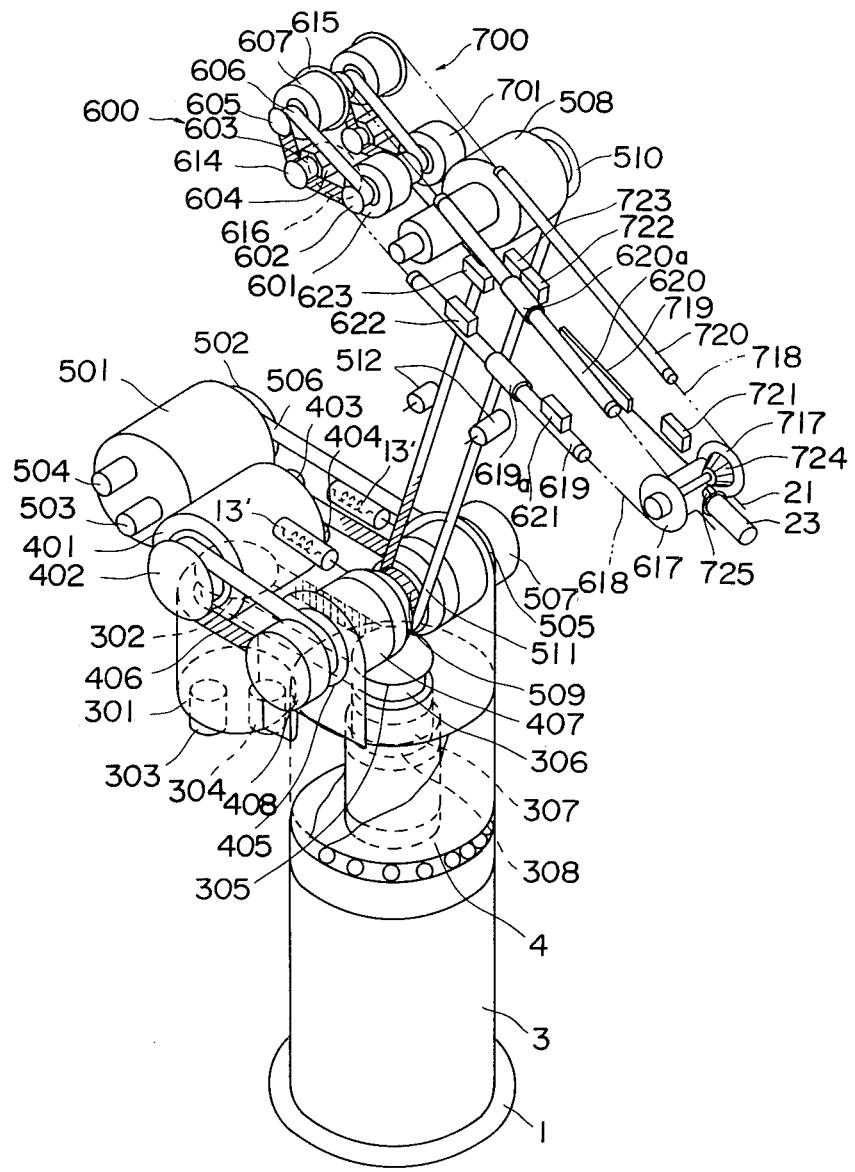
FIG. 28 is a perspective view of an internal structure of the FIG. 27 embodiment.

FIG. 27 is a perspective view of the above described other embodiment of an articulated robot. FIG. 28 is a view showing an internal structure. FIGS. 29 to 33 are views showing driving systems of the respective axes $\alpha_1$ to $\alpha_5$.

First referring to FIG. 27, the embodiment will be described. In FIG. 27, like portions have been denoted by like reference characters used in FIG. 1. The cylindrical base 3 is provided on the fixing member 1 and the rotating member 4 is rotatably provided at the top end thereof. The turning angle $\alpha_1$ is controlled with respect to the rotating member 4. The supporting member 7 is provided on the rotating member 4 and the arm 11 is turnably supported by the supporting member 7. The arm 11 is controlled with respect to the turning angle $\alpha_2$. The arm 17 turnably provided at the tip end of the arm 11 is controlled with respect to the turning angle $\alpha_3$. The turning wrist 21 turnably provided at the tip end of the arm 17 is controlled with respect to the turning angle $\alpha_4$. The rotating shaft 23 supports the torch fixture 25 and is supported to be coaxially rotatable with the wrist 21 and is controlled with respect to the rotating angle $\alpha_5$.

Now referring to FIG. 28, the internal structure of FIG. 27 embodiment will be described. Referring to FIG. 28, the numerals in the order of 300, the reference numerals in the order of 400, the reference numerals in the order of 500, the reference numerals in the order of 600 and the reference numerals in the order of 700 denote those components associated with the respective turning angles $\alpha_1$, $\alpha_2$, $\alpha_3$, $\alpha_4$ and $\alpha_5$, respectively.

The motor 301 may comprise a well-known direct current servomotor and corresponds to the motor 49 in FIG. 2 or 15. The motor 301 is provided such that the output shaft may be in parallel with the rotating member 4. The output shaft of the motor 301 is integrally provided with a pulley 302. A well-known tachometer generator 303 and incremental shaft encoder 304 are provided at the side opposite to the output shaft of the motor 302. On the other hand, a driven pulley 305 being mated with the pulley 302 is provided in association with the rotating member 4. A belt 306 is entrained between the driven pulley 305 and the pulley 302, so that the driven pulley 305 is rotatingly driven by the driving force of the motor 301. A brake 307 and a reduction gear 308 are coupled to the driven pulley 305. The reduction gear 308 may comprise a well-known "harmonic drive (trademark)" having a reduction ratio of approximately 1/100. The output casing of the reduction gear 308 is formed integral with the rotating member 4 and the above described pulley 305 is provided on the input shaft of the reduction gear 308. In the embodiment shown, the belt and pulley may be a well-known toothed belt such as timing belt and a toothed pulley engageable with the timing belt such as a timing pulley. Although not shown in detail, a dog is suitably provided on the outer periphery of the cylinder at the side of the output of the reduction gear 308. Three sets of microswitches, not shown, are provided at predetermined positions of the ratating member 4 in association with and so as to be engageable with the dog. The origin point signal associated with the turning angle $\alpha_1$ and the both end signal of the turning angle $\alpha_1$ are obtained by these microswitches.

A motor 401 is provided rearward of the motor 301. The motor 401 is aimed to turn the arm 11 and a pulley 401 is integrally provided to the output shaft of the motor 401. A driven pulley 405 being mated with the pulley 402 is provided. A belt 406 is set between the pulley 402 and the driven pulley 405. A tachometer generator 403 and an incremental shaft encoder 404 are associatedly provided at the side opposite to the output shaft of the motor 401. The driven pulley 405 is journaled to be rotatable on the rotating member 4. More specifically, a reduction gear 408 is provided with the output casing thereof journaled on the rotating member 4 and a pulley 405 and a brake 407 are provided on the input shaft thereof. The output casing of the reduction gear 408 is formed with a groove in the circumferential direction. Weight balancing means 13' for the arm 11 (corresponding to the balancer 13 in FIG. 1) is provided on the rotating member 4. The balancers 13' are structured such that one end of a tension spring is fixed in the cylinder and a wire is extended from the tip end of the spring. The tip end of the wire is fixed to a portion of the groove on the above described output casing. As a result, the rotation moment in the clockwise direction due to the weight of the arm 11 is balanced as a function of a spring force. Although not shown, a dog is provided at a suitable position on the peripheral surface of the output casing of the reduction gear 408. On the other hand, three sets of microswitches, not shown, are provided at predetermined positions of the rotating member 4 so as to be engageable with the dog. The origin point signal of the turning angle $\alpha_2$ of the arm 11 and the both end signal of the range of the turning angle $\alpha_2$ are obtained by these microswitches.

A counter shaft is journaled, although not shown, in the output casing of the reduction gear 408 and driven pulleys 505 and 509 and a brake 507 are provided on the counter shaft. Meanwhile, in the embodiment shown, the counter shaft is journaled inside the output casing of the reduction gear 408. However, if there is a margin in space, alternatively such counter shaft may be directly journaled by the rotating member 4. On the other hand, a motor 501 is provided rearward of the motor 401. The motor 501 is aimed to control the turning angle $\alpha_3$ of the arm 17. A pulley 502 is integrally provided to the output shaft of the motor 501 and a tachometer generator 503 and an incremental shaft encoder 504 are associatedly provided at the side opposite to the output shaft thereof. A belt 507 is set between the pulley 502 and the above described driven pulley 505, so that the driven pulley 505 and thus the above described counter shaft are rotatingly driven by the motor 501. On the other hand, a reduction gear 508 having the output shaft journaled at a suitable position is provided on the arm 17. A driven pulley 510 is integrally provided to the input shaft of the reduction gear 508.

A belt 511 is set between the pulley 509 and the driven pulley 510. The belt 511 is set with a suitable tension by means of the two tension pulleys 512 provided on the arm 11. Meanwhile, although not shown in detail, a suitable dog is also provided to the output casing of the previously described reduction gear 508. Three sets of microswitches, not shown, are then provided at predetermined positions in the arm 17 so as to be engageable with the dog, not shown. The origin point signal of the turning angle $\alpha_3$ and the both end signal of the range of the turning angle $\alpha_3$ or the arm 17 are obtained by these microswitches.

Two driving mechanisms 600 and 700 are provided at the rear end of the arm 17. The driving mechanism 600 is used for controlling the turning angle $\alpha_4$ of the shaft 23. The driving mechanism 600 comprises a motor 601 and a pulley 602 is integrally provided to the output shaft of the motor 601. A reduction gear 608 is provided rearward of the motor 601 and a driven pulley 605 is integrally coupled to the input shaft of the reduction gear 608. A belt 606 is set between the pulley 602 and the driven pulley 605. A tension pulley 614 is associatedly provided with the belt 606. A tachometer generator 603 and an incremental shaft encoder 604 are coupled to the tension pulley 614. A chain sprocket 615 is integrally provided to the output shaft of the reduction gear 608. On the other hand, a chain sprocket 617 is journaled at the tip end of the arm 17. A chain 618 is set between the chain sprockets 615 and 617. A tension sprocket 616 is toothed with the chain 618. Although the chain 618 is formed as endless, the midway portion not engaging with the sprocket may be replaced by rods 619 and 620. More specifically, the chain 618 comprises the rods 619 and 620 and a chain portion coupled therebetween. A sliding guide, not shown, is provided in the arm 17 in conjunction with these rods 619 and 620. Dogs 619a and 620a are provided in the rods 619 and 620 and these are fixed such that the axial directional positions may be adjustable by means of a screw means, now shown. Microswitches 621 and 622 engageable with the dog 619a are provided at suitable positions of the arm 17. The microswitch 623 engageable with the dog 620a is provided at a suitable position of the arm 17. The microswitch 622 generates the origin point signal of the turning angle $\alpha_4$ and the microswitches 621 and 623 provides the both-end signals of the range of the turning angle $\alpha_4$.

The driving mechanism 700 comprises a motor 701 and is structured in the manner similar to the above described driving mechanism 600 and is used for controlling the rotating angle $\alpha_5$. A more detailed description of the driving mechanism 700 will be omitted. A chain 718 is set between the chain sprocket 715 included in the driving mechanism 700 and the chain sprocket 717 provided at the tip end of the arm 17. The chain 718 is also formed as endless as similar to the previously described chain 618 but the midway portion thereof where the same is not engaged with the sprocket are coupled to the rods 719 and 720. A guide, not shown, is provided associated with the rod 719. Three microswitches 721, 722 and 723 are provided at suitable positions of the arm 17 to be engageable with the rod 719. The microswitch 722 provides the origin point signal of the rotating angle $\alpha_5$ and the microswitches 721 and 723 provide the both end signals of the range of the turning angle $\alpha_5$. The rotating shaft 23 is coaxially provided to the wrist 21. More specifically, the rotating shaft 23 has a bevel gear 725 at one end and is journaled by the wrist 21. The bevel gear 725 is toothed with a bevel gear 714 being rotated together with the chain sprocket 717. Accordingly, the bevel gear 724 is driven by the driving mechanism 700, whereby the rotating angle $\alpha_5$ of the rotating shaft 23 is controlled.

Now referring to FIGS. 29 to 33, the manner of controlling the respective turning angles $\alpha_1$ to $\alpha_5$ will be described.

Figure 29:
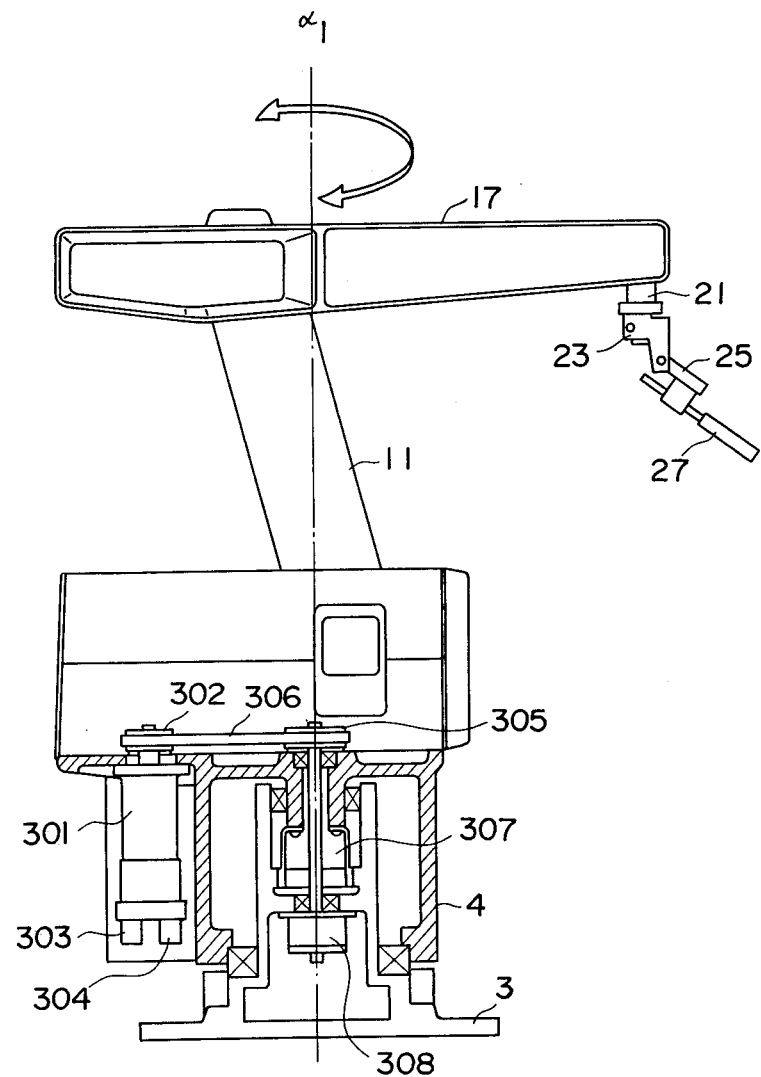
FIGS. 29 to 33 are views showing in some detail those portions associated with the control of the respective axes of the FIG. 27 embodiment.

As shown in FIG. 29, the turning angle $\alpha_1$ is controlled by the motor 301. More specifically, the motor 301 is energized and the driving force thereof is supplied through the pulley 302, the belt 306 and the pulley 305 to the reduction gear 308. The rotation driving input is reduced by the reduction gear 308 and the output from the reduction gear 308 is transmitted to the upper end of the base 3. However, since the base 3 has been fixed, the rotating member 4 is rotated with the output from the reduction gear 308. In order to fix the turning angle $\alpha_1$, therefore, the motor 301 is deenergized while the brake 307 is enabled. In the event that the rotating member 4 is rotated to exceed the range of the turning angle $\alpha_1$ due to some accident, the brake 307 is automatically actuated with the signal from the above described microswitch, not shown. Thus, the turning angle $\alpha_1$ is controlled by the motor 301.

Figure 30:
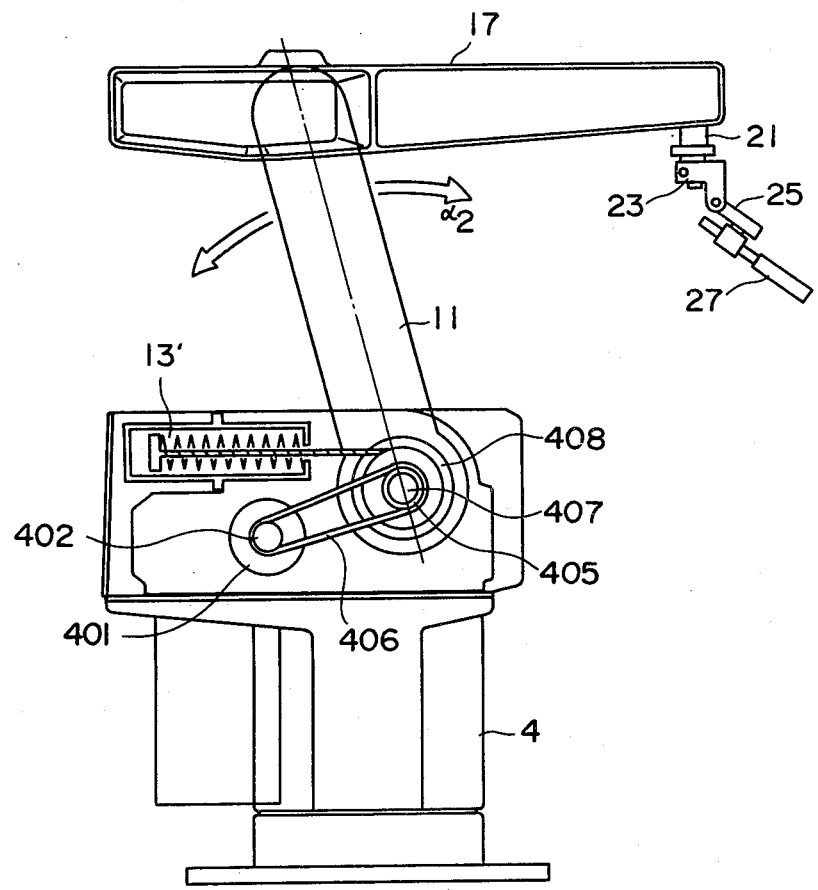

Now referring to FIG. 30, a control of the turning angle $\alpha_2$ will be described. The turning angle $\alpha_2$ is controlled by the motor 401. More specifically, the driving force of the motor 401 is transmitted through the pulley 402, the belt 406 and the pulley 405 to the reduction gear 408 and the arm 11 is turned with the reduced output obtained from the reduction gear 408. At that time the rotational moment in the clockwise direction of the arm 11 is balanced by means of the balancer 13'. The turning angle $\alpha_2$ is kept constant by deenergizing the motor 401 and by actuating the brake 407. Emergency stop is effected by the microswitch, not shown.

Figure 31:
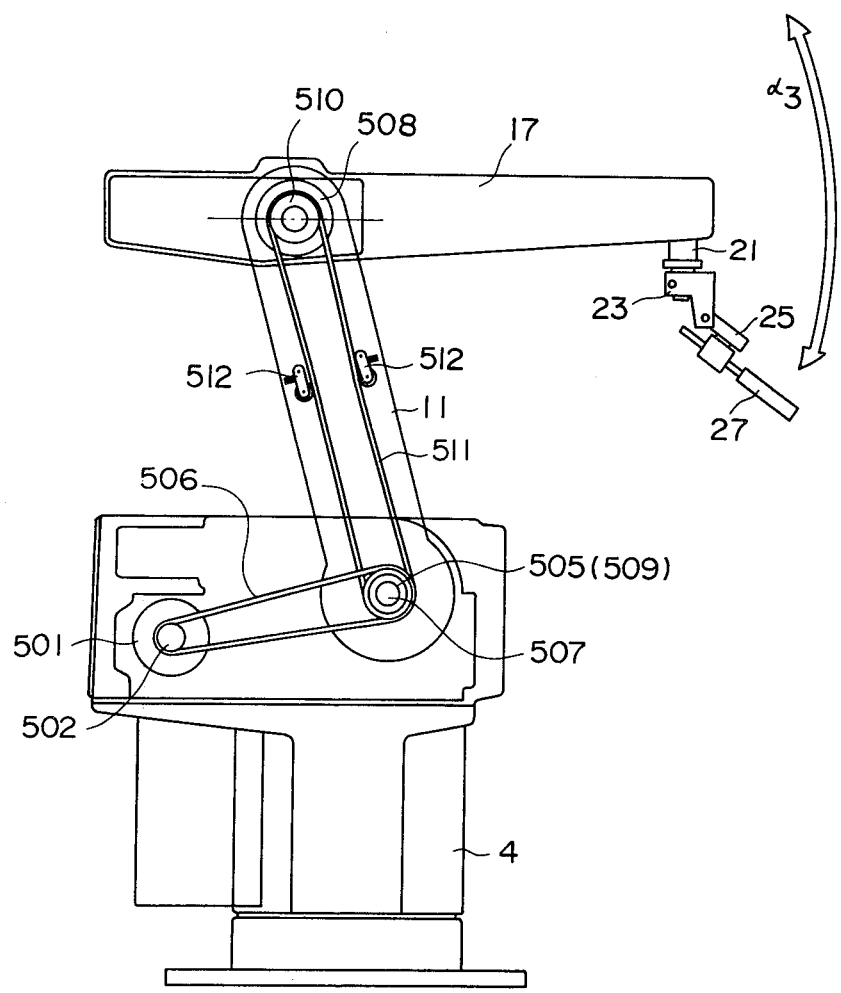

The turning angle $\alpha_3$ of the arm 17 is controlled by the motor 501 as shown in FIG. 31. More specifically, the driving force of the motor 501 is transmitted through the pulley 502, the belt 506, the pulleys 505 and 509, the belt 511 and the pulley 510 to the reduction gear 508. The arm 17 is turned with the output shaft of the reduction gear 508. At that time, a suitable tension is applied to the belt 511 by means of the tension pulleys 512. The turning angle $\alpha_3$ is kept constant by deenergizing the motor 501 and by actuating the brake 507 and emergency stop is effected by the microswitch, not shown.

Figure 32:
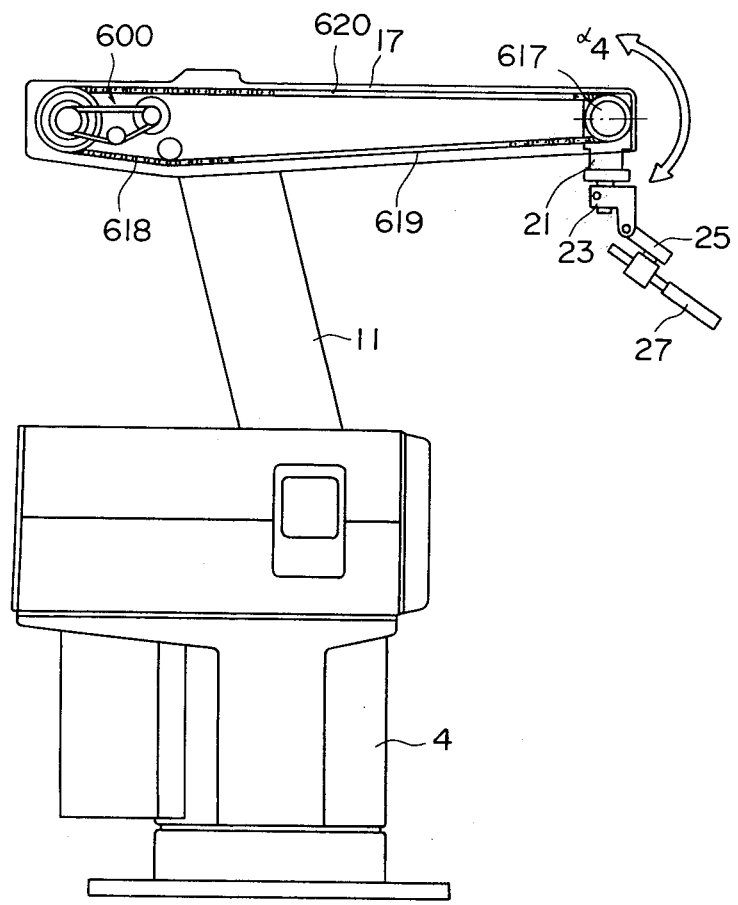

As shown in FIG. 32, the turning angle $\alpha_4$ of the wrist 21 is controlled by the driving mechanism 600. More specifically, the chain sprocket 615 is driven by the reduction gear 608 included in the driving mechanism 600 and the driving force thereof is transmitted through the chain 618 to the chain sprocket 617. Thus the wrist 21 directly coupled to the chain sprocket 617 is turned. In such a case, emergency stop is effected by the microswitches 621 and 623.

Figure 33:
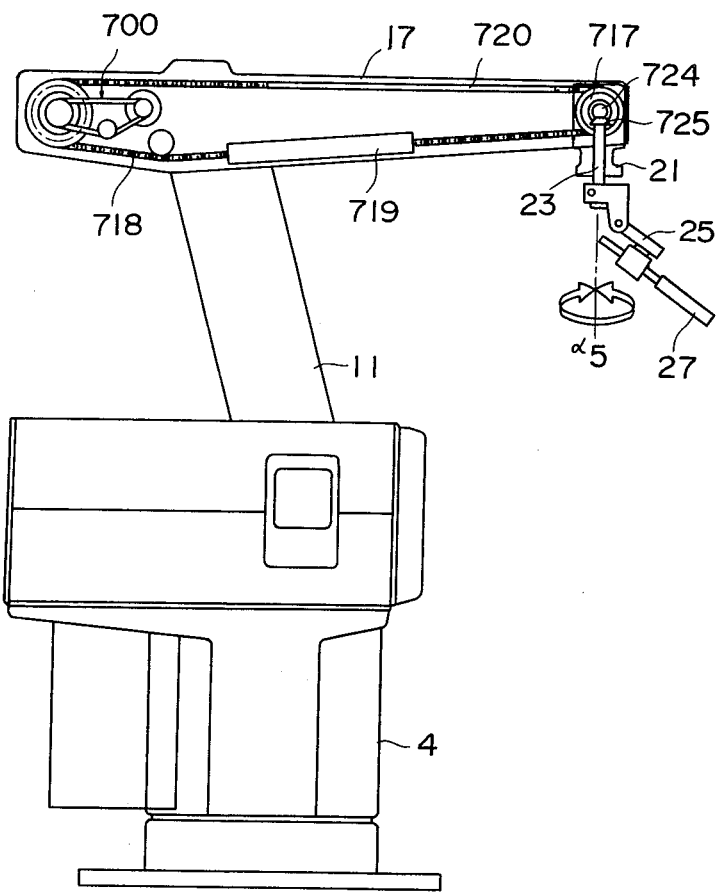

Furthermore, as shown in FIG. 33, the rotating angle $\alpha_5$ of the rotating shaft 23 is controlled by the driving mechanism 700. More specifically, the driving force of the driving mechanism 700 is transmitted to the chain sprocket 717 and the bevel gear 724 is rotated together with the chain sprocket 717. The bevel gear 725 toothed with the bevel gear 724 is accordingly turned and as a result the rotating angle $\alpha_5$ of the rotating shaft 23 is controlled by the driving mechanism 700. In such a case, emergency stop is effected by the microswitches 721 and 723.

Meanwhile, it should be appreciated that the above described incremental shaft encoder corresponds to the components 531 to 535 shown in FIG. 2 or 15. The angular information of the respective angles $\alpha_1$ to $\alpha_5$ is fed back from these incremental shaft encoders. The incremental shaft encoder fails to have the origin point indicating function by itself and suitably receives the origin point information by means of the microswitches of the above described respective axes, whereupon the origin point adjustment of the corresponding control systems are made. The tension of the belt and chain is suitably adjusted by means of the fixing position of the corresponding motor, the tension pulley, or the tension sprocket or the like. Accordingly, a slack of the belt and chain can be eliminated and accordingly a noise due to operation of these components can be prevented from occurring. By utilizing the timing belt and the timing pulley, a slip can be prevented and as a result precise control can be made.

Thus, according to the embodiments shown in FIGS. 28 to 33, unique advantages set forth in the following can be brought about. More specifically, since the turning mechanism is implemented not with a conventional parallelogram link mechanism but by means of a belt setting means, the range of the respective angles can be drastically increased as compared with a conventional one. Since a driven pulley is provided in the input shaft of the reduction machine, a tension of the belt can be decreased and a slacking amount can be decreased. As a result, a control of the turning angle of the respective arms can be made with high precision. Since a motor as a prime mover is provided rearward, a desired collision with an operator and a workpiece is prevented even when the rotating member is turned in association with the turning angle $\alpha_1$. In addition, since a rod is employed in conjunction with the chain, thereby to shorten substantially the length of the chain portion, a slacking amount of such chain can be decreased and accordingly a control of the turning angles $\alpha_4$ and $\alpha_5$ can be made with precision. Furthermore, since the driving mechanisms 600 and 700 including the motors are used also as a balance weight of the arm 17, a motor of unnecessarily large power need not be used as a prime mover for the turning angle $\alpha_3$.

It should be understood that in the specification and the appended claims the term "an articulated robot" should be construed to mean any type of robots having an articulated control system at least in a part of a control system of the robot. More specifically, even in the case where a major control system is a cartesian or rectangular coordinates system and an articulated control system is provided at the tip end thereof, the present invention can be equally applicable insofar as an object being controlled in the articulated control system can assume two different states.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An articulated robot including at least two arms for controlling the position or attitude of an object associated with one of said arms,
    wherein an articulation angle defined by said at least two arms can assume at least two different states for the same position or attitude of said object
    said robot comprising:
    teaching means comprising state information teaching means for teaching information representing one of said two states, and operating means for teaching information which is changeable for said two states upon controlling of said object by means of at least said operating means and includes data concerning said position or attitude said teaching means further comprising switch means for reversing said state, said switch means being enabled when the state of a previous teaching is in a predetermined state, and
    articulation angle controlling means comprising means responsive to said state information taught by said teaching means for controlling said articulation angle to said one of said two states.

2. An articulated robot in accordance with claim 1, wherein
    said operating means included in said teaching means comprises entry means for entering information concerning said position or attitude in the rectangular coordinates system, and
    said articulation angle controlling means comprises coordinates converting means responsive to said information concerning said position or attitude taught in said rectangular coordinates system for converting said information into information expressed by an articulated system for said articulation angle, and driving means responsive to angle data obtained from said coordinates converting means for driving at least two articulation angles.

3. An articulated robot in accordance with claim 1, wherein
said articulation angle controlling means comprises forcing means for forcing the information concerning said position or attitude in response to said information reversing means only if and when the information concerning said position or attitude is of said predetermined state.

4. An articulated robot in accordance with claim 1, wherein
said teaching means is structured to generate teaching information in either a rectangular coordinates system or an articulated system, and
said operating means comprises system selecting means for selecting said rectangular coordinates system when control is made only in one of said two states and for selecting said articulated system when control is made with respect to a change from said one to the other of said two states.

5. An articulated robot in accordance with claim 4, wherein
said articulation angle controlling means comprises means for storing identifying information associated with the magnitude of said articulation angle determined by said teaching means and for determining the articulation angle being controlled in accordance with said identifying information.

6. An articulated robot in accordance with claim 5, wherein
said teaching means comprises coordinates converting means for providing information of said rectangular coordinates system as said teaching information when said articulated system is selected by said system selecting means, and
said articulation angle controlling means comprises second coordinates converting means for making conversion to command information of said articulated system based on said information taught in said rectangular coordinates system, and
driving means responsive to angle data form said second coordinates converting means for driving at least two articulation angles.

7. An articulated robot in accordance with claim 5, wherein
said teaching means comprises coordinates converting means for providing said information of said articulated system as said teaching information when said rectangular coordinates system is selected by said system selecting means.

8. An articulated robot in accordance with claim 6, wherein
said articulation angle controlling means comprises interpolating means,
said interpolating means making an interpolating operation based on information of said rectangular coordinates system.

9. An articulated robot in accordance with claim 4, wherein said teaching means is adapted to provide said information of said articulated system as said teaching information when said articulated system is selected by system selecting means and to provide said information of said rectangular coordinates system as said teaching information when said rectangular coordinates system is selected by said system selecting means, and
said articulation angle controlling means comprises means for equiangular interpolating the portion for the information of said articulated system as taught.

10. An articulated robot in accordance with claim 1 which further comprises
a supporting member for pivotally supporting the base end of one of said two arms by means of a first shaft, the other of said two arms having the base end pivoted at the tip end of said first arm by means of a second shaft in parallel with said first shaft,
a first and second prime movers provided to said supporting member for controlling the turning angle of said two arms,
each said prime mover being provided rearward of said supporting member such that the output shaft thereof may be in parallel with said first shaft,
first power transmitting means including first entraining means for transmitting power from one of said two prime movers to one of said two arms and a first speed reducing unit, and
second power transmitting means including second entraining means for transmitting power from the other of said two prime movers to the other of said two arms and a second speed reducing unit.

11. An articulated robot in accordance with claim 10, wherein
said first entraining means comprises
a first pulley coupled to the output shaft of said one of said prime movers,
a second pulley coupled to said one of said arms, and
a belt entrained in an endless manner between said first and second pulleys.

12. An articulated robot in accordance with claim 10, wherein
said second entraining means comprises
a counter shaft which is of the same axis as that of said first shaft,
a third pulley coupled to said counter shaft,
a fourth pulley which is of the same axis as that of said second shaft, and
a belt entrained in an endless manner between said third pulley and said fourth pulley, and wherein
said second speed reducing unit comprises an input shaft coupled to said fourth pulley and an output shaft coupled to said other arm.

13. An articulated robot in accordance with claim 11 wherein each said belt comprises a toothed belt, and each said pulley comprises a toothed pulley engageable with said toothed belt.

14. An articulated robot in accordance with claim 10, which further comprises
a third arm having the base end pivoted at the tip end of said other arm by means of a third shaft in parallel with said second shaft, and
a third prime mover provided in said other arm rearward of said second shaft for controlling said third arm,
said third prime mover serving as a balance weight of said other arm.

15. An articulated robot in accordance with claim 14, which further comprises third power transmitting means for transmitting power from said third prime mover to said third arm, and wherein said third power transmitting means comprises
- a first chain sprocket having a shaft in parallel with said second shaft,
- a second chain sprocket coupled to the base end of said third arm, and
- a chain entrained in an endless manner between said first and second chain sprockets.

16. An articulated robot in accordance with claim 15, wherein a portion midway of said chain which is not engaged with said and first chain sprockets is replaced by a rigid body.

17. An articulated robot in accordance with claim 16, which further comprises microswitch means provided associated with said rigid body to be operable through engagement therewith, said microswitch means generating a signal for controlling said third arm.

18. An articulated robot in accordance with claim 12 wherein each said belt comprises a toothed belt, and each said pulley comprises a toothed pulley engageable with said toothed belt.

* * * * *